United States Patent
Eguchi

(10) Patent No.: US 8,330,995 B2
(45) Date of Patent: Dec. 11, 2012

(54) IMAGE FORMING APPARATUS, IMAGE FORMING METHOD AND PROGRAM

(75) Inventor: Kimimori Eguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 538 days.

(21) Appl. No.: 12/651,768

(22) Filed: Jan. 4, 2010

(65) Prior Publication Data

US 2010/0171991 A1   Jul. 8, 2010

(30) Foreign Application Priority Data

Jan. 8, 2009   (JP) ................................ 2009-002427

(51) Int. Cl.
*H04N 1/409* (2006.01)
*H04N 1/40* (2006.01)
*G06K 9/46* (2006.01)
*G06K 9/40* (2006.01)

(52) U.S. Cl. ....... 358/3.27; 358/300; 358/448; 347/131; 382/190; 382/209; 382/254

(58) Field of Classification Search ................. 358/3.27, 358/300, 448; 347/131; 382/190, 209, 254
See application file for complete search history.

(56) References Cited

U.S. PATENT DOCUMENTS

| 5,412,597 A | 5/1995 | Miyazaki et al. |
| 5,652,660 A * | 7/1997 | Seto et al. .................... 358/300 |
| 6,781,720 B1 | 8/2004 | Klassen |

FOREIGN PATENT DOCUMENTS

| JP | 2001-189849 | 7/2001 |
| JP | 2007-036699 | 2/2007 |

* cited by examiner

*Primary Examiner* — Charlotte M Baker

(74) *Attorney, Agent, or Firm* — Fitzpatrick, Cella, Harper & Scinto

(57) ABSTRACT

An object of the present invention is to provide an image forming apparatus that can perform a process of transforming an edge of an image such as trapping with less memory than prior art by using a small reference area and modification information.

7 Claims, 21 Drawing Sheets

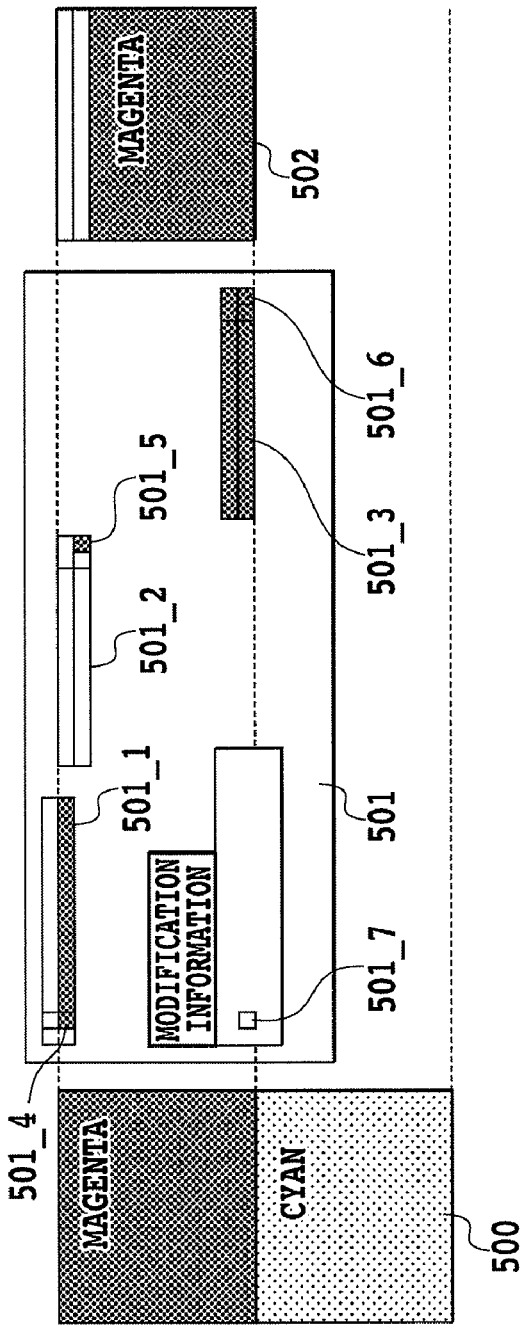
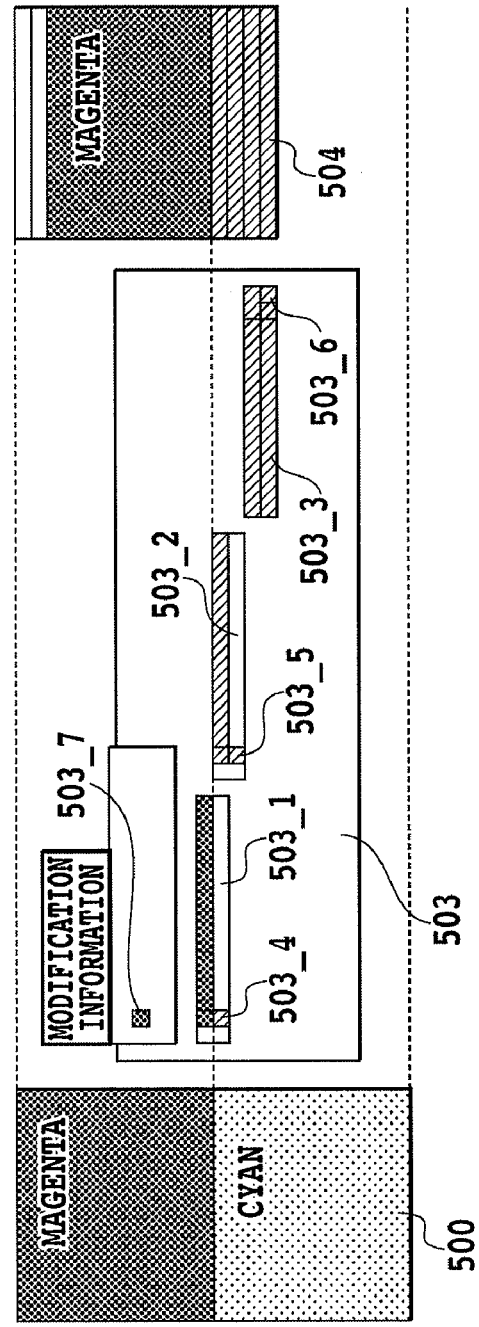
FIG.5A
FIG.5B

| RESOLUTION (dpi) | 1-PIXEL WIDTH | NUMBER OF PIXELS REQUIRED FOR 120 μm | REQUIRED LINE MEMORY(lines) |
|---|---|---|---|
| 600 | 40 μm | 3 | 6 |
| 1200 | 20 μm | 6 | 12 |
| 2400 | 10 μm | 12 | 24 |

FIG.15

| USER-SPECIFIED PIXEL WIDTH | 2 | 4 | 8 | 16 | 24 |
|---|---|---|---|---|---|
| PRIOR ART (lines) | 4 | 8 | 16 | 32 | 48 |
| EMBODIMENT 1 (lines) | 2 + α | 2 + α | 2 + α | 2 + α | 2 + α |
| EMBODIMENT 2 (lines) | 3 + α | 5 + α | 9 + α | 17 + α | 25 + α |

$\alpha < 1$

FIG.16

IMAGE FORMING APPARATUS, IMAGE FORMING METHOD AND PROGRAM

BACKGROUND OF THE INVENTION

1. Field of the Invention

The present invention relates to an image forming apparatus, an image forming method and a program that transform edges of an image such as trapping.

2. Description of the Related Art

There has been a method of changing, for a bitmap image, pixel values of pixels that are distant from edges of the image as a process of transforming the edges of the image such as image thickening or trapping (see, for example, Japanese Patent Laid-Open No. 2001-189849 or Japanese Patent Laid-Open No. 2007-036699). Here, the pixel value is a value that defines, for example, color, density, and brightness of a pixel.

With the method described above, a square reference area having a width twice as long as a specified modification width is obtained, with a pixel-of-interest as the center, so that pixels that are distant from the edge can also be modified. Ensuring a wide reference area allows determination of an edge of an image that is distant from the pixel-of-interest and transformation of the edge of the image.

<Prior Art 1>

For example, there is a prior art 1 that can obtain an image 402 by performing a process 401 on an image, such as an image 400 of FIG. 4A, in which cyan and magenta plates are adjacent to each other. Although the image 900 and the process 401 are shown side by side in FIG. 4A, actual processing is performed on respective pixels of the image 400, having predefined pixels-of-interests 401_1 to 401_5. The resulting image is shown by reference numeral 402. The following FIGS. 5A, 5B, 5C, 5D, 6, 8A, 8B, 9A, 9B, 10A, 10B, 14, 17A and 17B are to be viewed in a similar manner.

FIG. 3 is a flow chart of an image processing of the prior art 1.

In the process 401, if the trapping width is two pixels, for example, a memory corresponding to the pixels of the image 401_1 is obtained, i.e., an area extending above and below the pixel-of-interest 401_3 by two pixels each. (Here, a memory corresponding to three lines including the line of the pixel-of-interest is obtained because there is no pixel upper than the pixel-of-interest 401_3).

First, a reference area obtaining process is performed at S301_0 of FIG. 3, which passes the setting value of the trapping width from a register setting unit 302 and obtains a reference area 401_4.

Next, an inside-reference-area color plate determination process is performed at S301_1, where pixels in the reference area 401_4 are compared with the pixel-of-interest. Specifically, it is determined at S301_1 whether there are different color plates in the pixel-of-interest and pixels of the reference area.

If it is determined at S301_1 that there are different color plates in the pixel-of-interest and the pixels of the reference area, the process flow proceeds to S301_2. If, on the other hand, it is determined at S301_1 that there is no different color plate in the pixel-of-interest and the pixels of the reference area, the process flow proceeds to S301_3.

For example, in FIG. 4A, because there is no different color plate in the pixel-of-interest and the pixels of the reference area 401_4, trapping is not performed.

Therefore, the process flow proceeds to an unprocessed pixel detection process (S301_3).

The unprocessed pixel detection process is performed at S301_3, and because there still exists an unprocessed pixel the process flow proceeds to a pixel update process (S301_4).

As thus described, the process is performed sequentially while shifting the reference area by one pixel at a time, and the image 402 is obtained when the process is performed up to the pixel-of-interest 401_5 of the memory of the image 401_2.

Next, when there are two different color plates in the reference area such as image 403_1 of FIG. 4B, trapping is performed on pixel-of-interest 403_3. It is determined in the inside-reference-area color plate determination process (S301_1) that there are different color plates in the reference area, and the process flow proceeds to a modification process (S301_2), where trapping is performed. Subsequently, the process flow proceeds to the unprocessed pixel detection process (S301_3) to detect unprocessed pixels, and the process flow proceeds to the pixel update process (S301_4). Such processes are performed up to the pixel-of-interest 403_4 of image 403_2 and an image 404 is obtained as a result of trapping.

Finally, the above process is repeated also on the remaining images of the image 400 on which the above process has not been performed, and thereby an image 406 is finally obtained.

Specifically, the inside-reference-area color plate determination process (S301_1) determines, for a pixel-of-interest 405_3 of an image 405_1, that there is no different color plate in the reference area. The process flow then proceeds to the unprocessed pixel detection process (S301_3). At S301_3, unprocessed pixels are detected and the process flow proceeds to the pixel update process (S301_4). The process is performed up to a pixel-of-interest 405_4 of an image 405_2.

The above process allows trapping from a boundary of an image to both sides with a trapping width of two pixels.

Although trapping (a process of thickening or thinning only a particular area of an image) has been described, the above process is also capable of thickening or thinning the entire bitmap image.

<Prior Art 2>

A prior art 2 that reduces the memory required for image trapping will be described below.

As an example, a process will be described which performs trapping for a case, such as an image 1400 of FIG. 14, where an image of the cyan plate and an image of the magenta plate are adjacent to each other along the sub-scanning direction.

First, an image of two lines from the image 1400, such as an image 1401_1 of FIG. 14, is written into the memory. Here, only the line of the pixel-of-interest is written because there is no pixel upper than a pixel-of-interest 1401_3.

Next, a 2×2 reference area 1401_4 is obtained around the pixel-of-interest 1401_3.

Then, the pixel-of-interest is modified, referring to the color plate that is different from that of the pixel-of-interest in the reference area. Here, the pixel-of-interest is not modified because there is no different color plate in the reference area.

Next, the modified pixel-of-interest is output as an output image, and the process flow proceeds to the next pixel-of-interest. Repeating the process in the image 1401_2 written into the memory until the pixel-of-interest comes to 1401_5, an image 1402 is obtained after the process is completed.

Next, an image of two lines including a pixel-of-interest 1403_3, such as an image 1403_1 of FIG. 14, is written into the memory.

Then, a 2×2 reference area 1403_4 is obtained around the pixel-of-interest 1403_3. The pixel-of-interest is then modified, referring to the color plate that is different from that of the pixel-of-interest in the reference area 1403_4.

Next, the modified pixel-of-interest is output as an output image. Then, modification information described below is generated, and the process flow proceeds to the next pixel-of-interest. The process is performed along the main-scanning direction up to a pixel-of-interest 1403_5 of an image 1403_2 written into the memory. As a result of this process, an image 1404 is obtained. In addition, the modification information is generated as an image 1405_6.

A pixel-of-interest is thereafter updated along the sub-scanning direction. Here, an image 1405_1 of two lines including a pixel-of-interest 1405_3 is written into the memory in a similar manner.

A 2×2 reference area 1405_4 is then obtained around a pixel-of-interest 1405_3.

There is no color plate different from that of an edge or the pixel-of-interest in the reference area 1405_4. Referring to the image 1405_6 included in the previously generated modification information, however, the color plates of the pixel-of-interest and the image 1405_6 included in the modification information are different, and thus the pixel-of-interest is modified. An image 1406 is obtained by performing the above modification process along the main-scanning direction up to a pixel-of-interest 1405_5 of an image 1405_2 written into the memory.

Finally, for the remaining images that have not gone through the process of the image 1400, an image 1407_1 of two lines including a pixel-of-interest 1407_3 is written into the memory by a process 1407.

A 2×2 reference area 1407_4 is then obtained around the pixel-of-interest 1407_3.

Then, referring to a color plate different from that of the pixel-of-interest in the reference area, the pixel-of-interest is modified and output. Here, trapping is not performed because there is no different color plate in the reference area.

Performing the above-mentioned process sequentially up to a pixel-of-interest 1407_5 of an image 1407_2 written into the memory gives an image 1408 including a part 1409 on which trapping (a process of thickening the magenta plate) has been performed along a direction from the magenta plate to the cyan plate.

In the prior art 2, the information preserved by the line memory includes the reference area and modification information. Here, the number of lines corresponding to the height of the reference area is one, and thus reducing the memory required for the modification information can suppress the amount of line memory required for the prior-art 2.

Depending on the hardware, however, there are the following problems when performing trapping or a process of thickening or thinning the image. That is, a number of lines corresponding to the height of the reference area must be preserved in the memory for the pixels-of-interest 1301 and 1303 as shown in FIGS. 13A and 13B, for example, in the prior art 1. This is because a wide reference area must be obtained by the reference area obtaining process (S301_0) in the prior art 1, since the inside-reference-area color plate determination process (S301_1) must determine whether there are different color plates in the reference area.

In other words, in the prior art 1, a reference area twice as wide as the trapping width specified by the user must be obtained, which requires a large amount of cost.

Additionally with the prior art 1, because the process is performed in a pixel-by-pixel manner, a larger number of pixels must be processed to obtain the same trapping width along with increase of resolution, which requires a larger amount of line memory.

As shown in FIG. 15, for example, three pixels are required with a resolution of 600 dpi in order to obtain a trapping width of about 120 μm, and thus a line memory of six lines is necessary. With a resolution of 1200 dpi, a line memory of 12 lines is necessary.

Additionally, with the prior art 2, although the magenta plate can be thickened in the finally obtained image 1408, the cyan plate cannot be thickened, as shown in FIG. 14. This is because the pixel-of-interest can only be modified in the process direction from the pixel-of-interest due to inadequacy of the modification information. With the prior art 2, accordingly, there may be portions where pixel information of the edge portion can or cannot be modified, depending on the direction of the image transformation process.

It is therefore an object of the present invention to solve the problems of the prior art.

SUMMARY OF THE INVENTION

In order to solve the above problems, an image forming apparatus according to the present invention includes: a reference area obtaining unit that generates and preserves, for a pixel-of-interest of an image, a plurality of pixels around the pixel-of-interest as a reference area; a modification information preserving unit that preserves modification information of pixels of the image; a modification information determining unit that determines whether there is modification information relating to pixels in the reference area which are preserved by the reference area obtaining unit; a modification-information-referring modification unit that modifies, if the modification information determining unit determines that there is modification information, the pixel-of-interest referring to the modification information; a reference-area-referring modification unit that modifies the pixel-of-interest based on information in the reference area if the modification information determining unit determines that there is no modification information; a modification information updating unit that updates the modification information based on modification by the reference-area-referring modification unit; and a shift unit that modifies the write timing of the image.

According to the present invention, a process of transforming edges of an image such as trapping can be performed with less memory than before by using a smaller reference area and modification information.

Further features of the present invention will become apparent from the following description of exemplary embodiments with reference to the attached drawings.

BRIEF DESCRIPTION OF THE DRAWINGS

FIGS. 5A, 5B, 5C and 5D show image processing of an embodiment 1;

FIG. 15 shows the number of line memories required to obtain a trapping width of 120 µm;

FIG. 16 shows the number of line memories required for trapping; and

DESCRIPTION OF THE EMBODIMENTS

Figure 1:
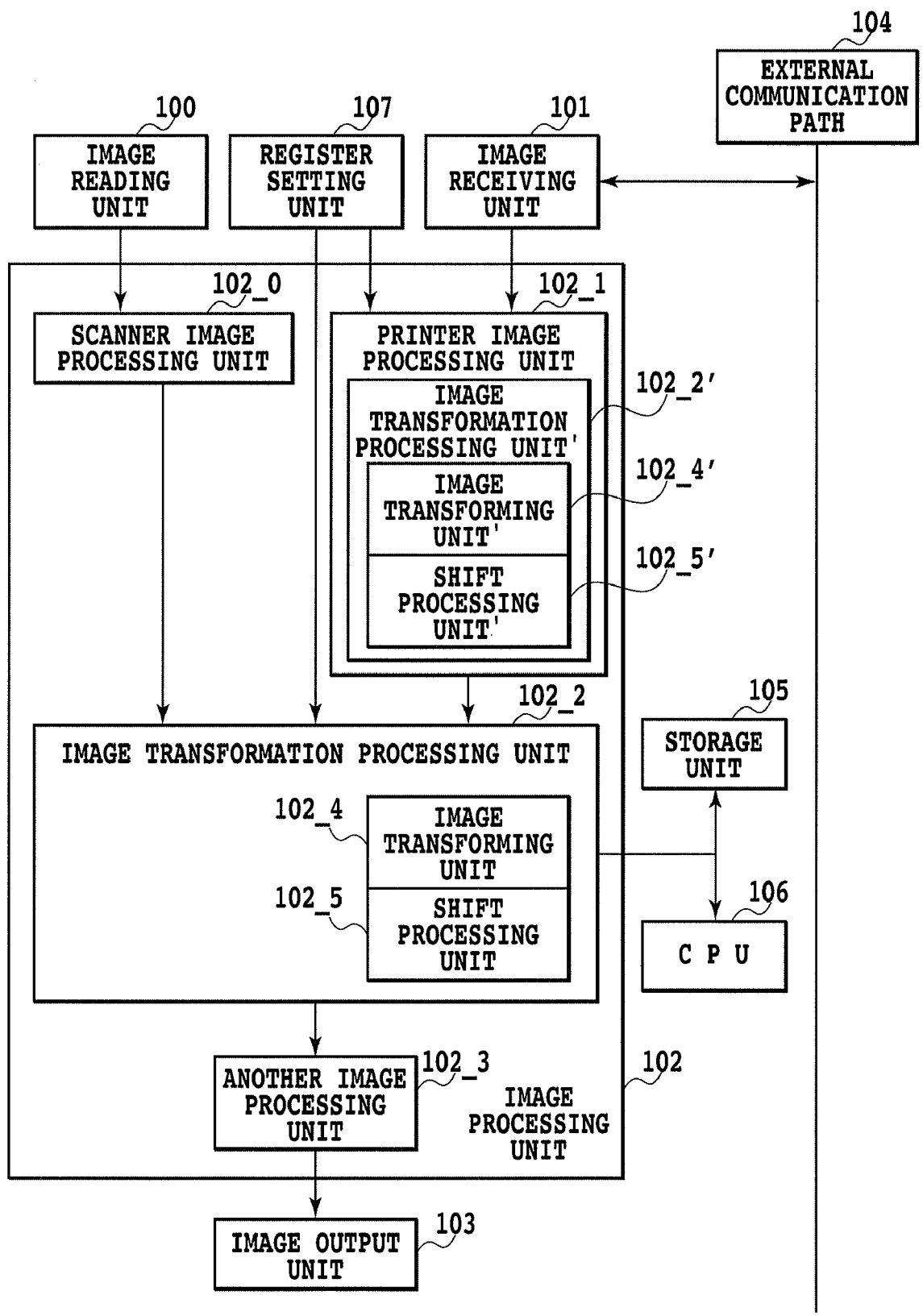
FIG. 1 is a schematic block diagram of an image forming apparatus.

Details of the image processing in an image forming apparatus according to an embodiment of the present invention will be described below, referring to the drawings.

Embodiment 1

FIG. 1 is a block diagram of an image forming apparatus according to embodiment 1. In the present embodiment, although a complex machine is assumed as an image forming apparatus, not only a complex machine but also other printing devices such as a color printer may be used as the image forming apparatus.

First, the configuration of the image forming apparatus according to the present embodiment will be described below.

As shown in FIG. 1, the image forming apparatus includes an image reading unit 100, an image receiving unit 101, an image processing unit 102 that performs a variety of image processing, a storage unit 105, a CPU 106, and an image output unit 103.

The image forming apparatus can also be connected, via a network such as a LAN or the Internet, to a server that manages image data, and a personal computer (PC) that instructs the image forming apparatus to perform printing. In addition, the image forming apparatus according to the present invention can be connected to an external communication path 104 via the image receiving unit 101.

Functions of respective components of the image forming apparatus shown in FIG. 1 will be described below.

The image reading unit 100 reads an RGB color image.

RGB data read by the image reading unit 100 is sent to the image processing unit 102.

A scanner image processing unit 102_0 of the image processing unit 102 performs image processing on the RGB data. Image processing performed by the scanner image processing unit 102_0 includes, for example, well-known shading compensation, image area separation, and color conversion.

The image receiving unit 101 receives PDL image data. The PDL image data received by the image receiving unit 101 is sent to a printer image processing unit 102_1. Note that, in addition to PDL image data, the image receiving unit 101 can receive any image data expressed by a group of commands associated with individual images that compose the image.

An interpreter of the printer image processing unit 102_1 interprets the group of commands of PDL image data and outputs intermediate codes.

An RIP (Raster image processor/not-shown) of the printer image processing unit 102_1 expands the intermediate codes to a bitmap image, and develops attribute information for each pixel from attribute information included in the group of commands. Here, the attribute information includes, for example, graphic attribute, color attribute, natural image attribute, character attribute, and thin-line attribute.

An image transformation processing unit 102_2 accepts data for setting the trapping width described below from the scanner image processing unit 102_0, the printer image processing unit 102_1, and a register setting unit 107 to perform transformation of the image.

An image transforming unit 102_4 included in the image transformation processing unit 102_2 performs a process of changing the shape of the image. The process performed by the image transforming unit 102_4 includes, for example, trapping, black overprint, and thickening or thinning the image.

A shift processing unit 102_5 included in the image transformation processing unit 102_2 performs a process of adjusting the write timing of the image.

Another image processing unit 102_3 receives data from the image transformation processing unit 102_2 and performs predefined color processing and dithering on the data received from the image transformation processing unit 102_2.

A case where the image transformation processing unit 102_2 performs a image transformation process has been described above. However, an image transforming unit' 102_4' of an image transformation processing unit' 102_2' included in the printer image processing unit 102_1 may perform the image transformation process. Also a shift processing unit' 102_5' included in the printer image processing unit 102_1 may perform the process of adjusting the write timing of the image.

The components and functions of the storage unit 105, the CPU 106, and the image output unit 103 of the image forming apparatus shown in FIG. 1 will be described below.

The storage unit 105 includes storage media such as a random access memory (RAM) and read only memory (ROM). In the storage unit 105, for example, a RAM is used as an area for storing data and a variety of information, or as a working area of the CPU 106. On the other hand, a ROM is used in the storage unit 105 as an area for storing various control programs, for example.

The CPU 106 is used to determine and control various processes according to programs stored in the ROM included in the storage unit 105.

The image output unit 103 outputs images. For example, the image output unit 103 forms and outputs images on printing paper.

Although the transformation process has been described above to be performed on bitmap data after the RIP, processes such as trapping or black overprint may be performed on image data in the RIP.

When the transformation process is performed on the image data in the RIP, the image transforming unit' 102_4' of the image transformation processing unit' 102_2' performs a process such as trapping or black overprint.

Figure 12:
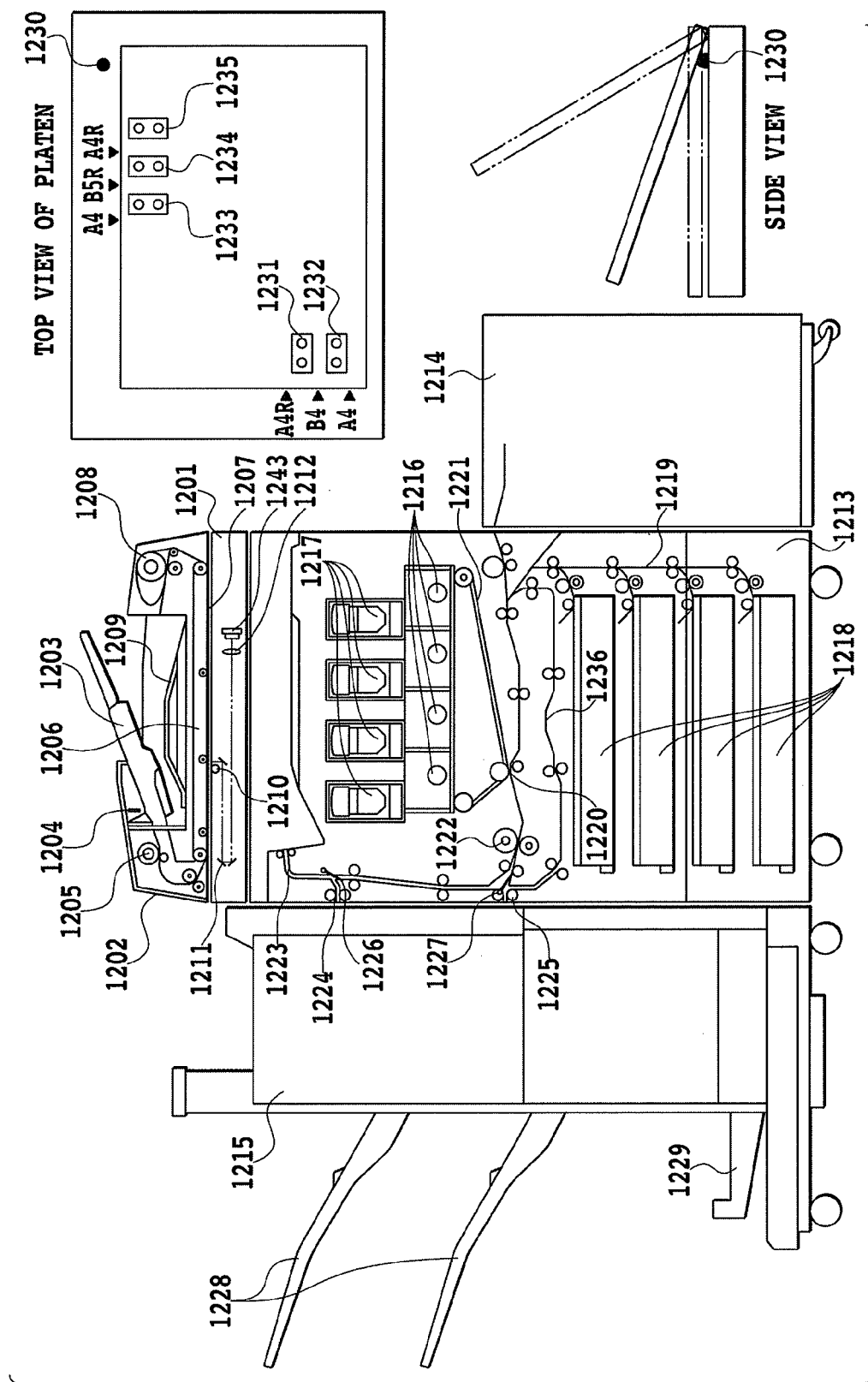
FIG. 12 shows hardware of the image forming apparatus of FIG. 1.

FIG. 12, showing the hardware of the image reading unit 100, image receiving unit 101, and image output unit 103 of the image forming apparatus of FIG. 1, is a cross sectional view of the image forming apparatus of FIG. 1. Details of the components of the image forming apparatus that has been described referring to FIG. 1 will be described below, referring to FIG. 12.

The image forming apparatus shown in FIG. 12 includes respective functions of copy/printer/FAX machines.

As shown in FIG. 12, the image forming apparatus includes a scanner 1201, a document feeder (DF) 1202, and a printer 1213 for recording prints having four photoconductive drums: cyan, magenta, yellow and black. In addition, the image forming apparatus includes a paper feed deck 1214 and a finisher 1215.

A reading operation performed mainly on the scanner 1201 will be described below.

When a document is set on a platen 1207 and reading of the document is performed, the DF 1202 is closed with the document set on the platen 1207.

An open/close sensor 1230 detects that the DF 1202 is closed. Then, light-reflecting document size detection sensors 1231 to 1235 provided in the housing of the scanner 1201 detect the size of the document set on the platen 1207. Subsequent to detection of the document size by the document size detection sensors 1231 to 1235, a light source 1210 irradiates the document according to scan read or copy instructions. A CCD (charge-coupled device) 1243 then receives light reflected from the document via a reflector plate 1211 and a lens 1212 to read the image.

Subsequently, a controller of the image forming apparatus (the image processing unit 102) converts the image data read by the CCD 1243 into digital signals and performs a desired image processing to convert it into laser recording signals. The converted recording signals are stored in a memory in the controller.

When the document is set on and read from the OF 1202, the document is placed face up on the tray of a document setting unit 1203 of the DF 1202.

A document detection sensor 1204 detects that a document has been set, a document feed roller 1205 and a conveyor belt 1206 thereby rotate to transport the document, and thereby the document is set at a predefined position on the platen 1207. Thereafter, the document is read in a similar manner as when the document is read from the platen 1207 and the resulting recording signals are stored in the memory in the controller.

When reading of the document is completed, the conveyor belt 1206 rotates again to feed the document to the right side of the cross sectional view of the image forming apparatus in FIG. 12, and the document is discharged to a sheet discharge tray 1209 via a conveyor roller 1208 at the sheet discharge side.

When there is a plurality of documents, the next document is fed from the left of the cross sectional view of the image forming apparatus via the paper feed roller 1205 at the same time a document is discharged and conveyed from the platen 1207 to the right side of the cross sectional view of the image forming apparatus, and thereby subsequent documents are read in sequence.

The operation of the scanner 1201 has thus been described.

A printing operation performed mainly by the printer 1213 will be described below.

The recording signal (print image data) temporarily stored in the memory in the controller is transferred to the printer 1213. The recording signal is then converted by the laser recording unit of the printer 1213 into four-color recording laser beams: cyan (C), magenta (M), yellow (Y) and black (K). The recording laser beams are then irradiated on a photosensitive material 1216 of each color, to form an electrostatic latent image on each photosensitive material.

The printer 1213 then uses toner supplied from a toner cartridge 1217 to develop the toner on each photosensitive material.

The toner image made visible on each photosensitive material is then primarily transferred on an intermediate transfer belt 1221.

Figure 13A:
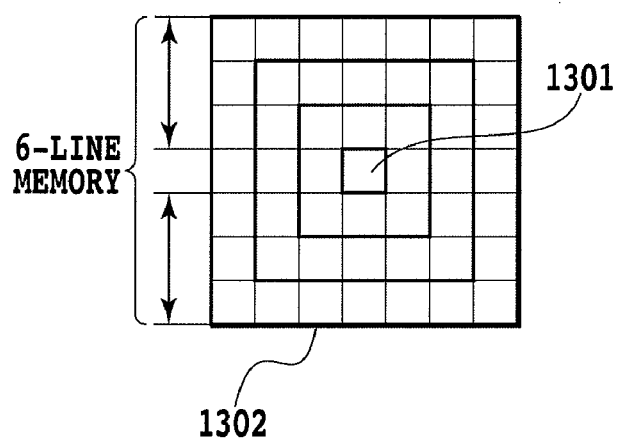
FIGS. 13A and 13B show the relation between a reference area and a line memory.
Figure 13B:
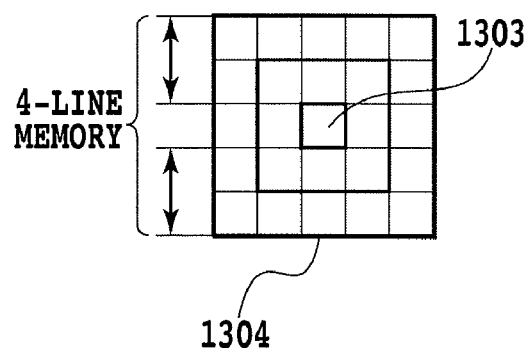
Figure 14:
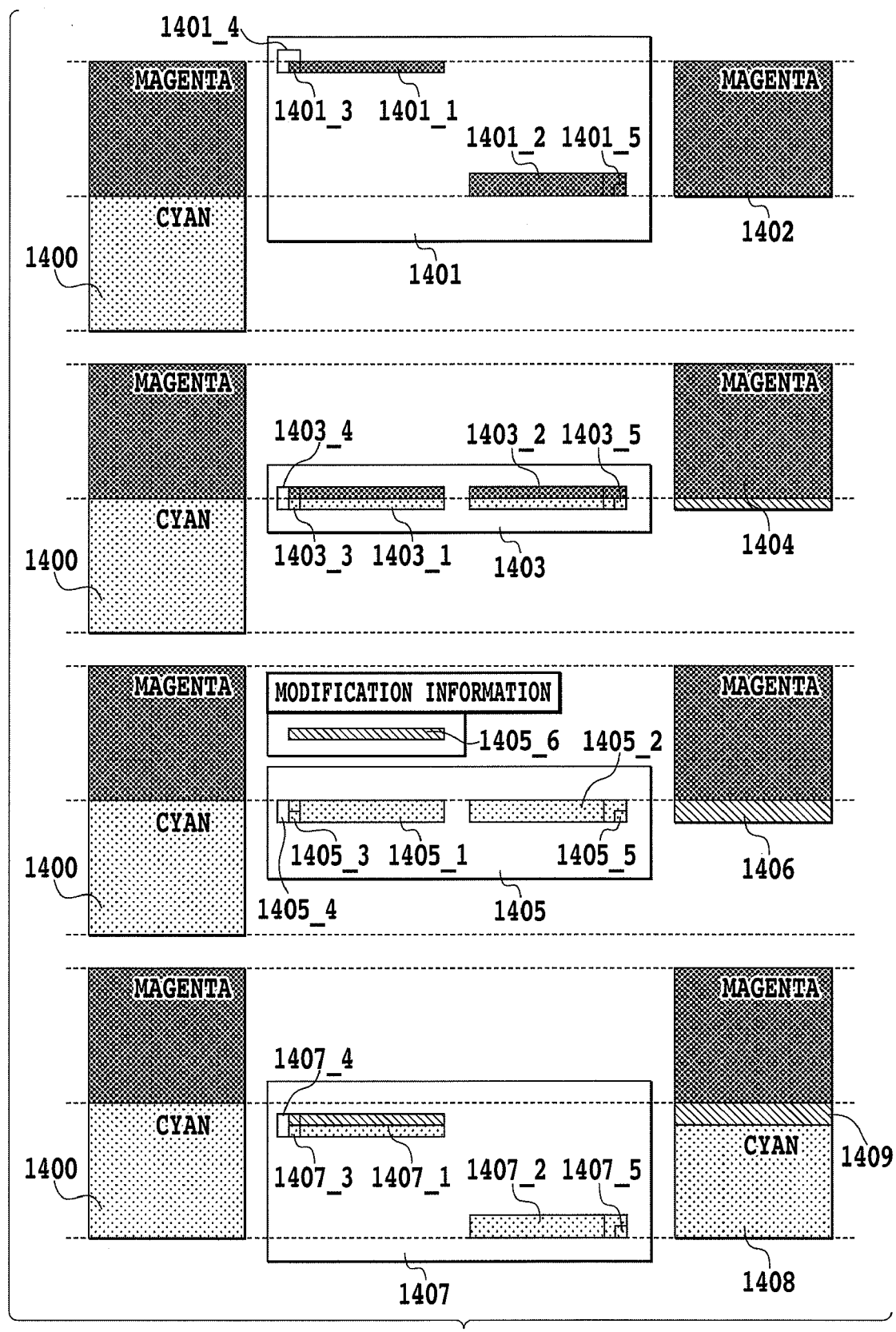
FIG. 14 shows image processing of the prior-art 2.

The intermediate transfer belt 1221 rotates clockwise in FIGS. 13A and 13B.

When a recording sheet fed from a paper cassette 1218 or the paper feed deck 1214 through a paper feed path 1219 has reached a secondary transfer position 1220, a toner image is transferred to the recording sheet from the intermediate transfer belt 1221.

A fixing device 1222 fixes toner by applying pressure and heat on the recording sheet having the image transferred thereon.

Subsequently, after being transported through the sheet discharge path, the recording sheet is discharged to a face-down center tray 1223, or switched back to a discharge outlet 1224 to the finisher or discharged to a face-up side tray 1225. Here, the side tray 1225 is a discharge outlet to which sheets can be discharged only when the finisher 1215 is not installed.

Flappers 1226, and 1227 switch the transportation path to switch the discharge outlet. In the case of duplex printing, the flapper 1227 switches the transportation path after the recording sheet passed through the fixing device 1222, and subsequently, the recording sheet is switched back and sent downward, and then fed to the secondary transfer position 1220 again via a duplex printing paper transportation path 1236, where duplex printing is performed.

The operation performed in the finisher 1215 will be described below.

The finisher 1215 performs postprocessing on the printed sheet according to the function specified by the user. Specifically, the finisher 1215 has functions such as stapling (single binding, double binding) and a punching (two-hole punching, three-hole punching), or saddle stitching.

The recording sheet that has passed through the discharge outlet 1224 to the finisher 1215 is distributed to sheet discharge trays 1228 corresponding to respective copy/print/FAX functions according to the user's setting.

Although depicted as a four-color drum printer, the printer 1213 may be a one-color drum engine, or a monochrome printer engine.

In addition, when used as a printer, the image forming apparatus can be configured by a driver for various options including monochrome printing/color printing, paper size, 2-UP printing/4-UP printing/N-UP printing, duplex printing, stapling, punching, saddle stitching, slip sheet, front cover, back cover, or the like.

The flow of the process performed by the image transformation processing unit 102_2 of FIG. 1 is outlined below.

First, as shown in FIG. 1, the image transformation processing unit 102_2 performs the process base on the data from the register setting unit 107. The data, specifying the trapping width (number of pixels), is manually set by the user.

The outline of the flow of the process performed by the image transformation processing unit 102_2 will be described below in comparison with prior art.

Figure 2:
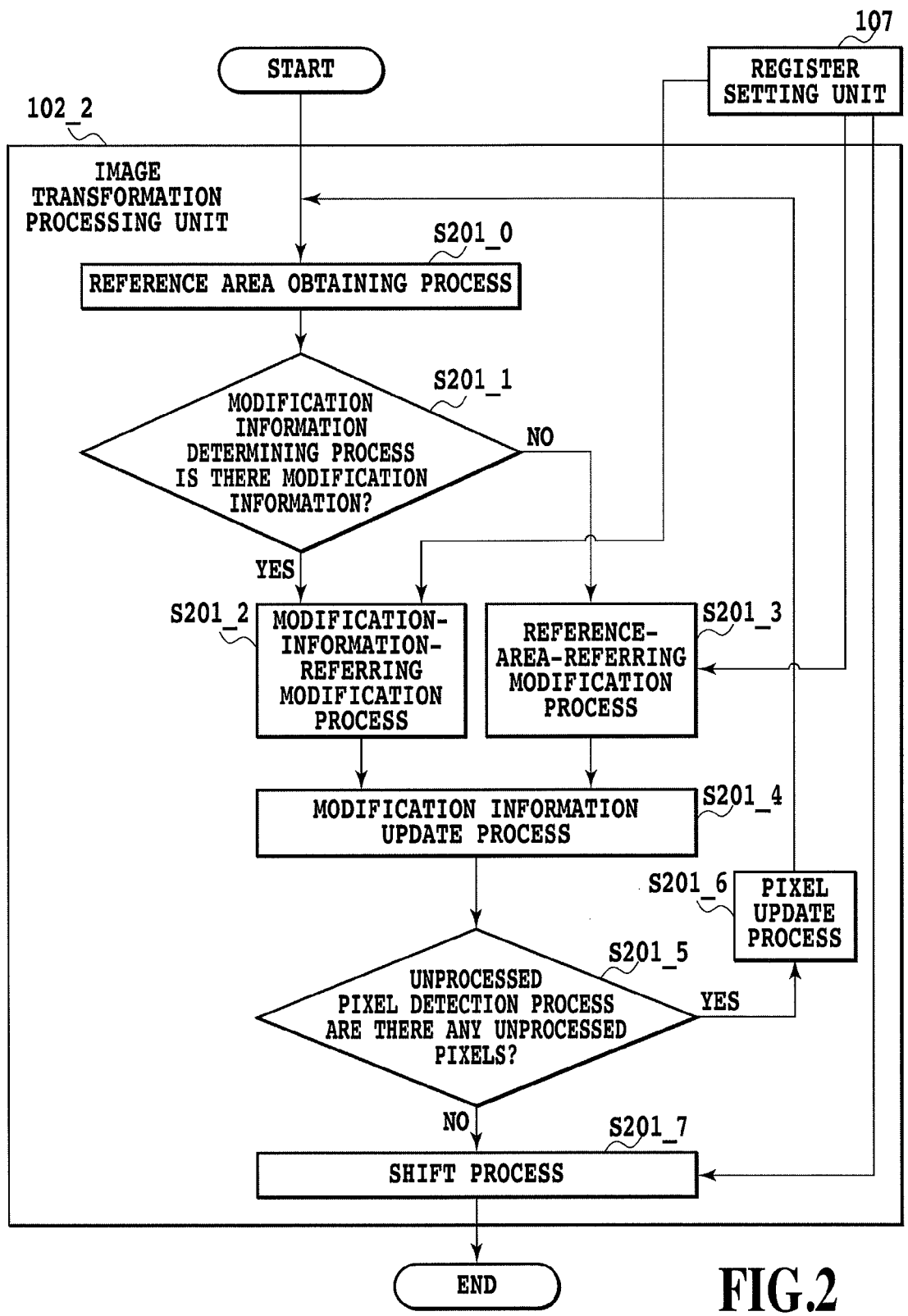
FIG. 2 shows a flow chart of an image processing.

First, in the present embodiment, the reference area obtaining process is performed at S201_0 of FIG. 2, and thereby a certain reference area is obtained regardless of the pixel width specified by the user. That is, a plurality of pixels around the pixel-of-interest is generated at S201_0 and preserved as the reference area for the pixel-of-interest of the image.

Figure 3:
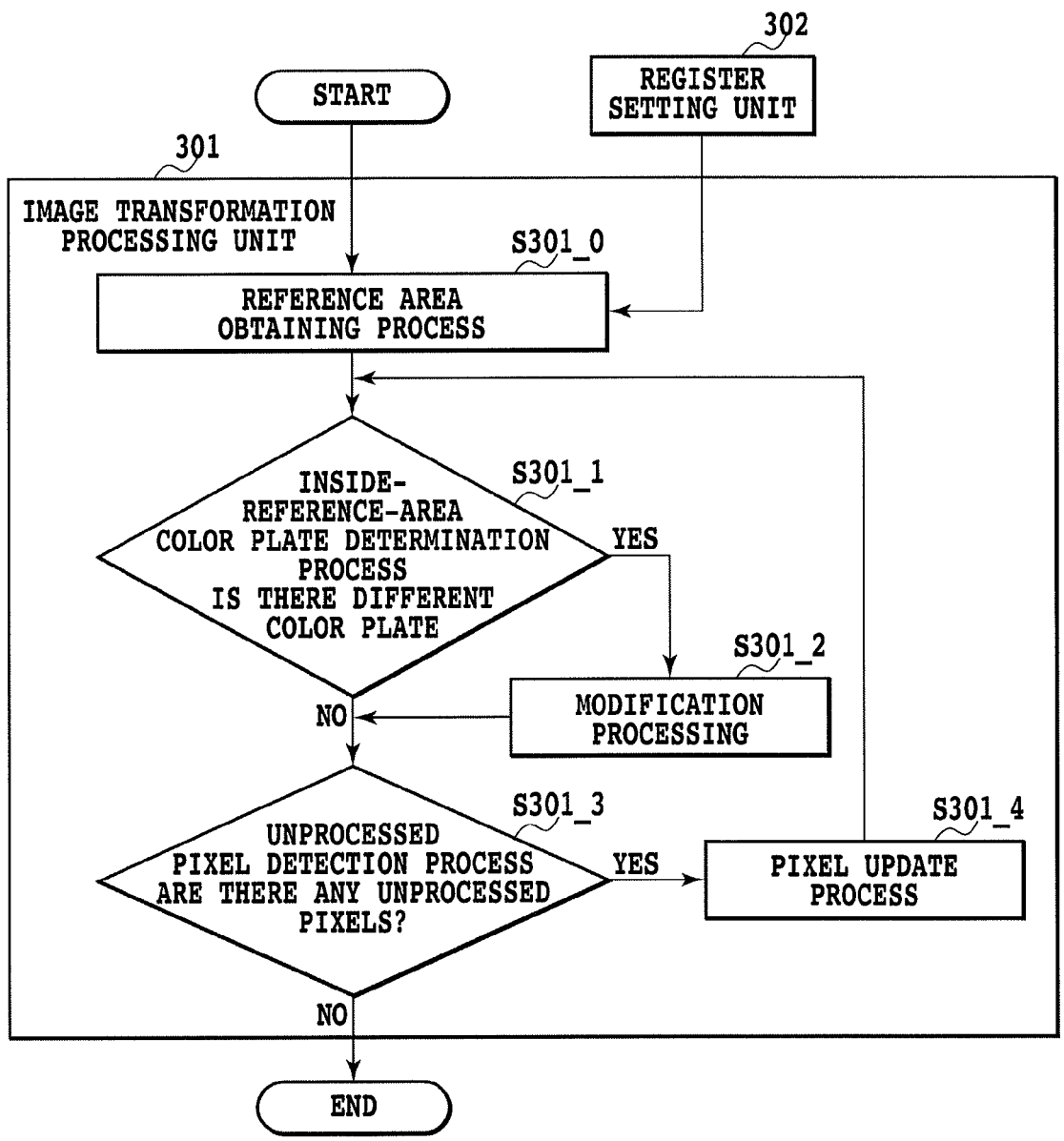
FIG. 3 shows a flow chart of an image processing of prior-art 1.
Figure 4A:
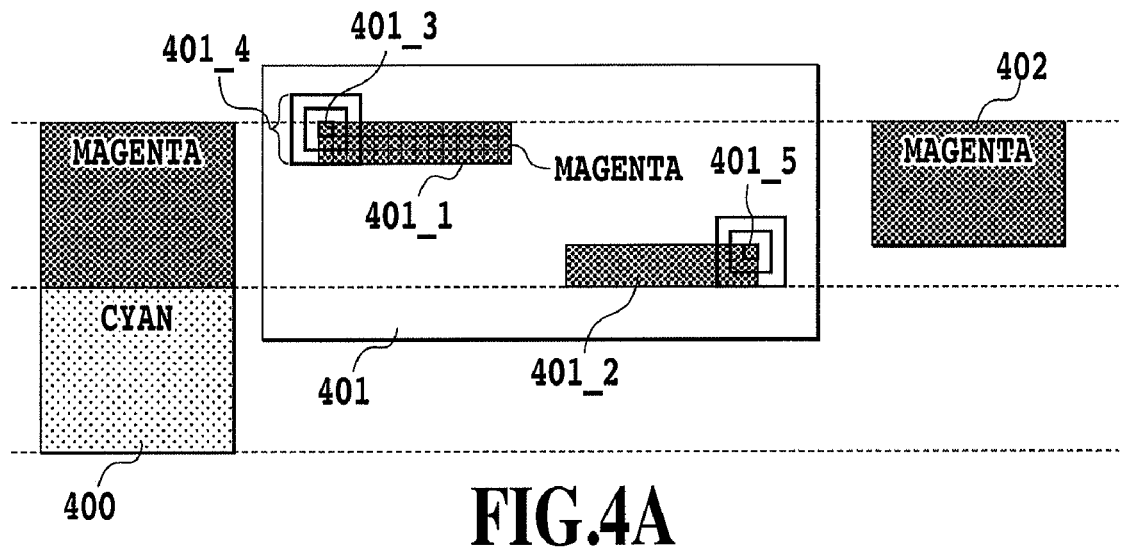
FIGS. 4A, 4B and 4C show image processing of the prior-art 1.
Figure 4B:
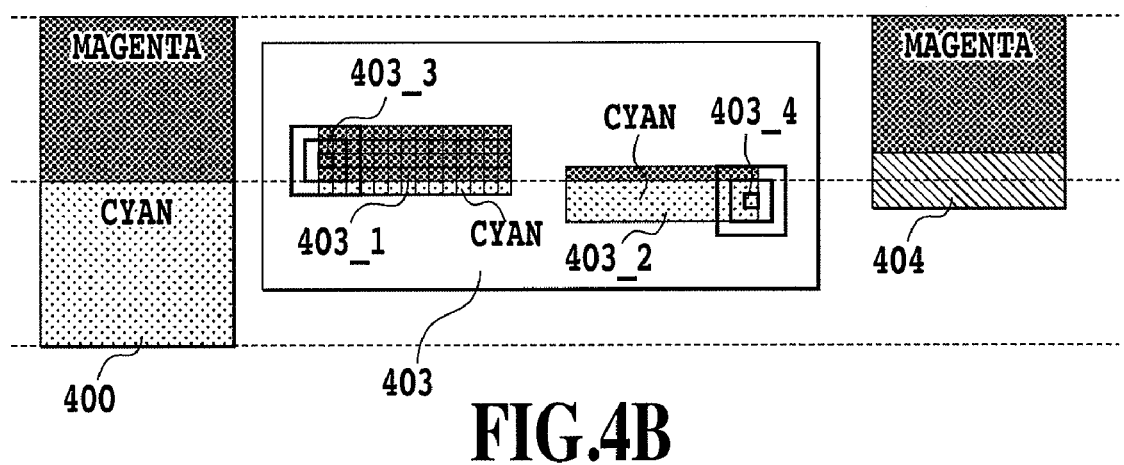
Figure 4C:
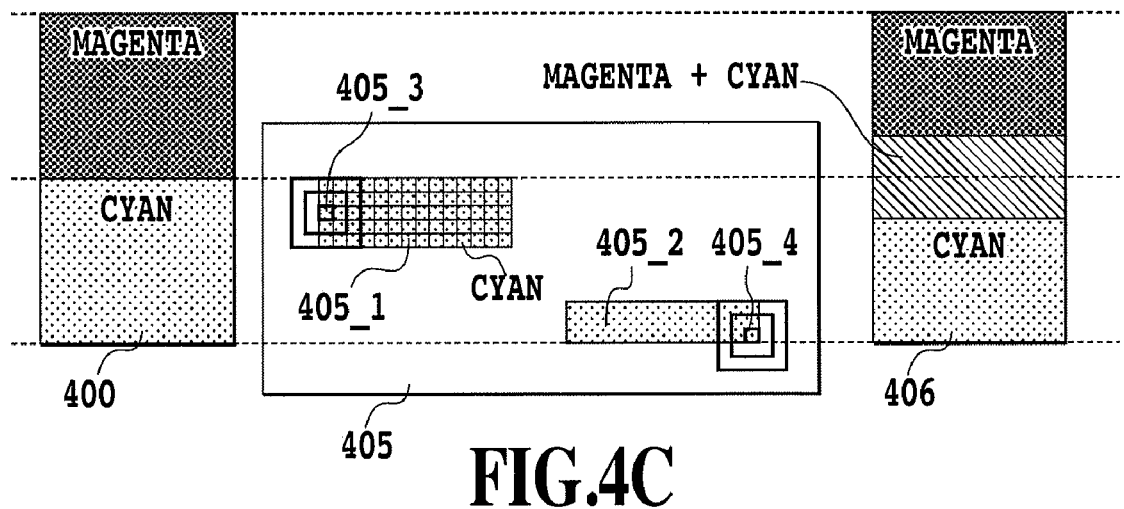

With prior-art, on the other hand, the reference area obtaining process is performed at S301_0 of FIG. 3, and thereby a reference area twice as large as the register value is obtained, referring to the register setting unit 302. Accordingly a large amount of memory has been required by prior art.

The modification information determining process is performed at S201_1 of FIG. 2, and thereby it is determined whether there is modification information with regard to pixels in the reference area.

If it is determined at S201_1 that there is modification information, the process flow proceeds to S201_2, where an update-information-referring modification process is performed and the modification process is performed, referring to the modification information and the information set in the register setting unit 107.

If it is determined at S201_1 that there is no modification information, the process flow proceeds to S201_3 where the reference-area-referring modification process is performed, and the pixel-of-interest is modified, referring to the information set in the register setting unit 107, based on the information in the reference area.

Subsequently, the process flow proceeds to S201_4, where a modification information update process is performed to update the modification information based on the modification by the update-information-referring modification process (S201_2) or the reference-area-referring modification process (S201_3). In the modification information update process of S201_4, a modification information preserving process is also performed, and thereby the modification information of pixels of the image is preserved. Additionally, in the modification information update process of S201_4, a pixel information update process is also performed, and thereby information of pixels on which the modification process has been performed is updated. Additionally, in the modification information update process of S201_4, the pixel information preserving process is also performed, and thereby information of pixels which has been modified is preserved.

Next, the unprocessed pixel detection process is performed at S201_5, where it is determined whether there are any unprocessed pixels. If there is an unprocessed pixel, the process flow proceeds to the pixel update process (S201_6) and starts processing of the next unprocessed pixel.

If, on the other hand, it is determined at S201_5 that there is no unprocessed pixel, the process flow proceeds to the shift process (S201_7), where the shift process is performed to change the write timing of the image, and the process is completed.

Next, the flow of the process performed by the image transformation processing unit 102_2 will be specifically described below.

Figure 7:
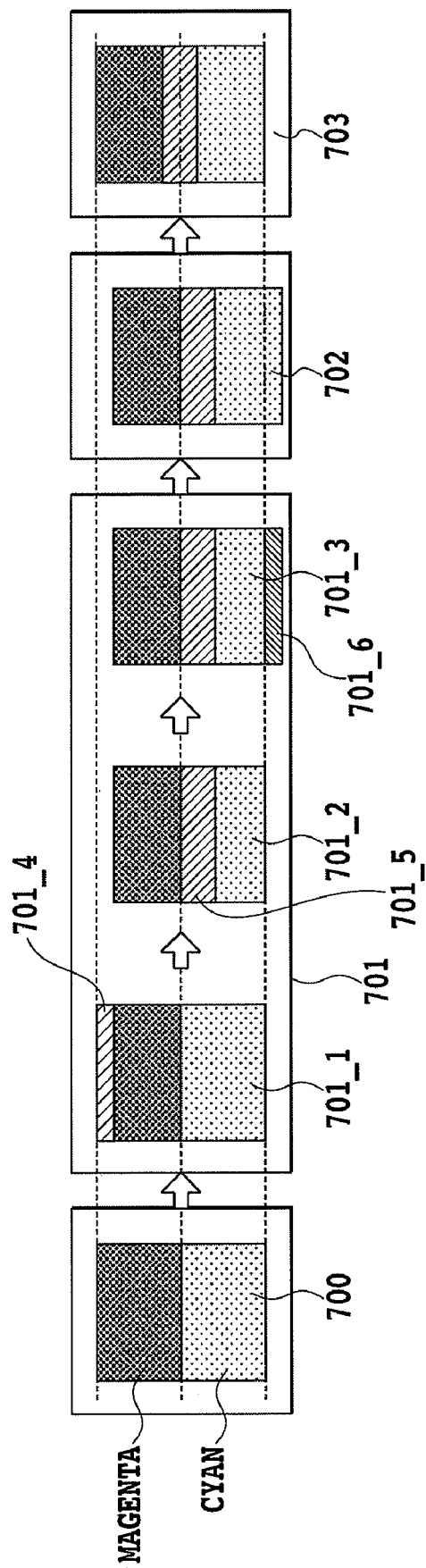
FIG. 7 shows image processing of the embodiment 1.

A process of performing trapping of two pixels for images of the magenta and cyan plates as shown in FIG. 7 will be described below.

When performing trapping of two pixels for the images of the magenta and cyan plates, the image transforming unit 102_4 in the image transformation processing unit 102_2 of FIG. 1 performs a process as described below.

First, the image transforming unit 102_4 performs a process (the process shown in FIGS. 8A and 8B) of thinning the slant-line area 701_4 of the magenta plate of the image 701_1 of FIG. 7 by the trapping width.

Next, the image transforming unit 102_4 performs a process (the process shown in FIGS. 9A and 9B) of thickening the pixels that are twice the trapping width in the slant-line area 701_5 of the image 701_2 of FIG. 7 which is the boundary between the magenta and cyan plates.

Next, the image transforming unit 102_4 performs a process (process shown in FIGS. 10A and 10B) of thickening the slant-line area 701_6 of the cyan plate of the image 701_3 by the trapping width.

As a result, the image transforming unit 102_4 generates an output image 702 as shown in FIG. 7.

Subsequently, the shift processing unit 102_5 generates an image 703 of FIG. 7 in which trapping has been performed for two pixels on the images of magenta and cyan plates, by changing the write timing along the main-scanning direction by a desired width. Here, the above desired width may be, for example, the same number of pixels as with the information (register value (threshold value)) that has been set in the register setting unit 107.

FIGS. 5A, 5B, 5C, and 5D are drawings for illustrating the process shown in FIG. 7 more in detail.

In a process 501 of FIG. 5A, two lines of an image 501_1 from an original image (image to be processed) 500 is written into the memory.

Next, a 2×2 reference area 501_4 is obtained around the pixel-of-interest. With regard to the color plate for which the pixel-of-interest in the reference area 501_4 does not have a value, it is determined whether neighboring pixels have a value, and the pixel-of-interest is modified. Since the pixel-of-interest has, and neighboring pixels do not have, a value in the magenta plate in this occasion, the density (pixel value) of the magenta plate of the pixel-of-interest is modified to zero.

Next, the modified pixel-of-interest is output as an output image and modification information 501_7 is generated, and the reference area is shifted by one pixel along the main-scanning direction. This process is performed up to a pixel-of-interest 501_5 of an image 501_2 written into the memory. Here, the density (pixel value) of pixels of two lines from the edge of the image is modified to zero.

Furthermore, the process is performed up to a pixel-of-interest 501_6 of an image 501_3 written into the memory. At this point, an image 502 for which a process of thinning the upper part of the image by the trapping width (two pixels) is performed has been obtained.

Next, in the boundary between the magenta and cyan plates of FIG. 7, trapping is performed in the image 701_2 by twice as many pixels as that of the trapping width.

Specifically, in the process 503 of FIG. 5B, two lines of an image 503_1 from the original image 500 is written into the memory.

Next, a 2×2 reference area 503_4 is obtained around the pixel-of-interest. With regard to a color plate for which the pixel-of-interest in the reference area 503_4 does not have a value, it is determined whether peripheral pixels have a value, and the density (pixel value) of the pixel-of-interest is modified. Where only cyan has the density (pixel value) for the pixel-of-interest (other components are zero), for example, the density of the pixel-of-interest is modified by setting the pixel value of a pixel of the magenta plate in the reference area to be the density (pixel value) of the magenta plate of the pixel-of-interest. Incidentally, modification information (501_7 etc.) is stored in the line memory (not shown) in the image transformation processing unit 102_2.

The modified pixel-of-interest is output as an output image and modification information 503_7 is generated, and the reference area is shifted by one pixel along the main-scanning direction. This process is performed up to a pixel-of-interest 503_6 of an image 503_3 written into the memory.

Pixels-of-interest, from the pixel-of-interest 503_5 of the image 503_2 to the pixel-of-interest 503_6 of the image 503_3 that have been written into the memory, are modified based on the modification information.

As a result, an image 504 for which trapping is performed at the boundary of images for an area corresponding to four pixels twice the trapping width (two pixels) is obtained.

Furthermore, a process of thickening the lower part of the image of the cyan plate by the trapping width is performed to generate an output image including the slant-line area 701_6 of the cyan plate of the image 701_3 of FIG. 7, and thereby an image 702 is obtained.

Figure 5C:
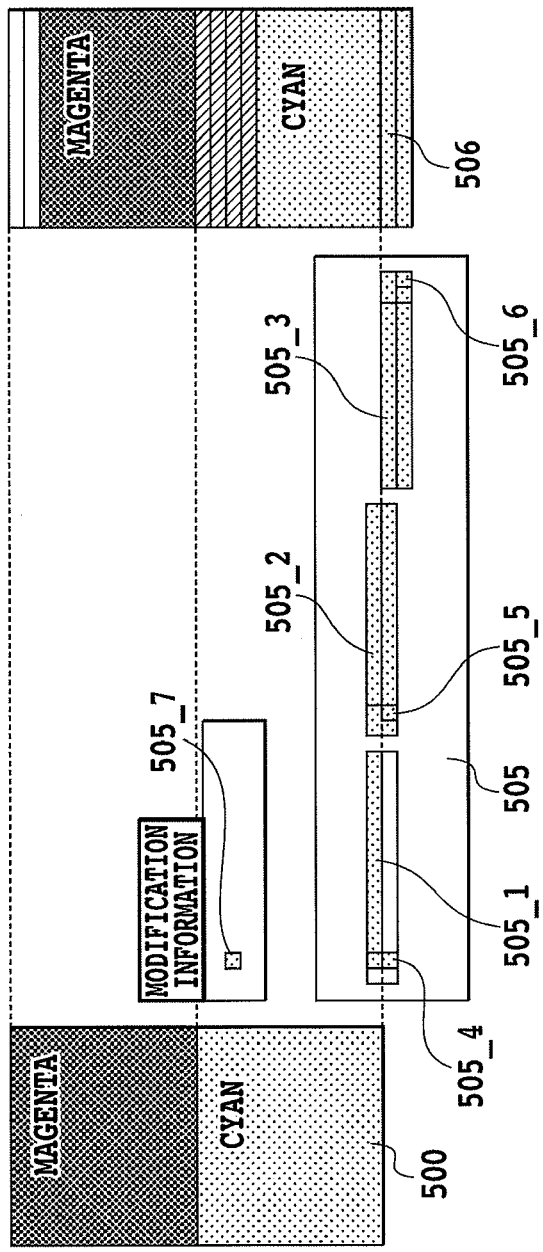

Specifically, in a process 505 of FIG. 5C, two lines of an image 505_1 from the original image 500 is written into the memory.

Next, a 2×2 reference area 505_4 is obtained around the pixel-of-interest. With regard to a color plate for which the pixel-of-interest in the reference area 505_4 does not have a value, it is determined whether neighboring pixels have a value, and the pixel-of-interest is modified. In this occasion, the density (pixel value) of the pixel-of-interest is modified to the density (pixel value) of the pixel of a color plate different from that of the pixel-of-interest in the reference area 505_4.

Next, the modified pixel-of-interest is output as an output image and modification information 505_7 is generated, and the reference area is shifted by one pixel along the main-scanning direction. This process is performed from a pixel-of-interest 505_5 of an image 505_2 written into the memory to a pixel-of-interest 505_6 of an image 505_3 written into the memory.

Note that pixels-of-interest, from the pixel-of-interest 505_5 to the pixel-of-interest 505_6, are modified based on the modification information.

Figure 5D:
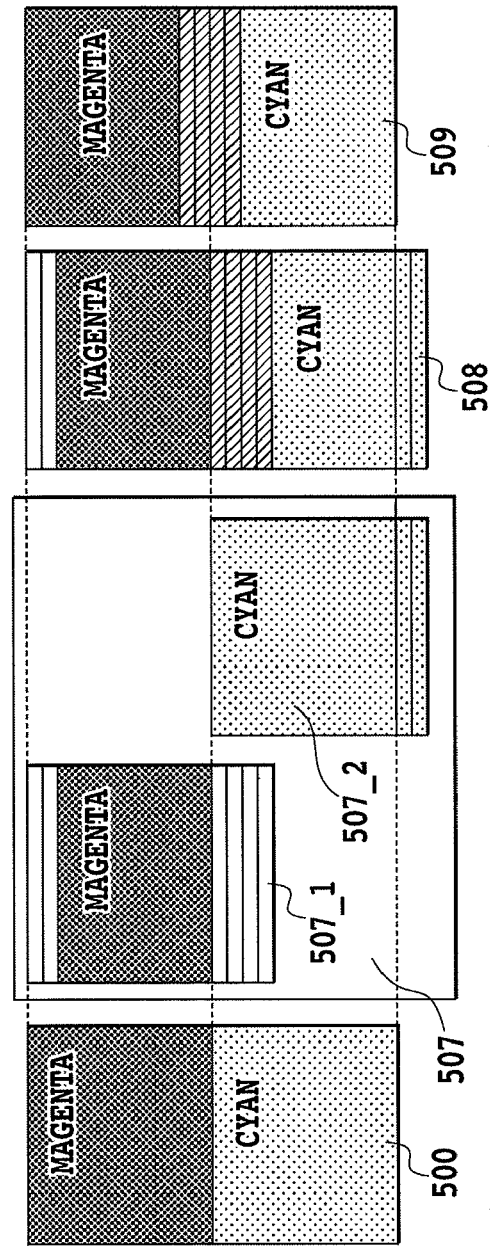

As a result, in a process 507 of FIG. 5D, the upper part of the image has been thinned by two pixels in a magenta plate 507_1 of the original image 500 whereas the lower part of the image has been thickened by four pixels. For a cyan plate 507_2, on the other hand, the upper part of the image has not been modified whereas the lower part of the image has been thickened by two pixels. Therefore images 506 (508) are obtained combining the magenta plate 507_1 and the cyan plate 507_2.

Furthermore, the image 508 is shifted by a shift unit (not shown) by a number of pixels set in the above-mentioned register along an upward direction of the image, and an image 509 is obtained.

A flow of the process performed by the image transformation processing unit 102_2 according to the present embodiment will be specifically described by using other examples below.

Figure 8A:
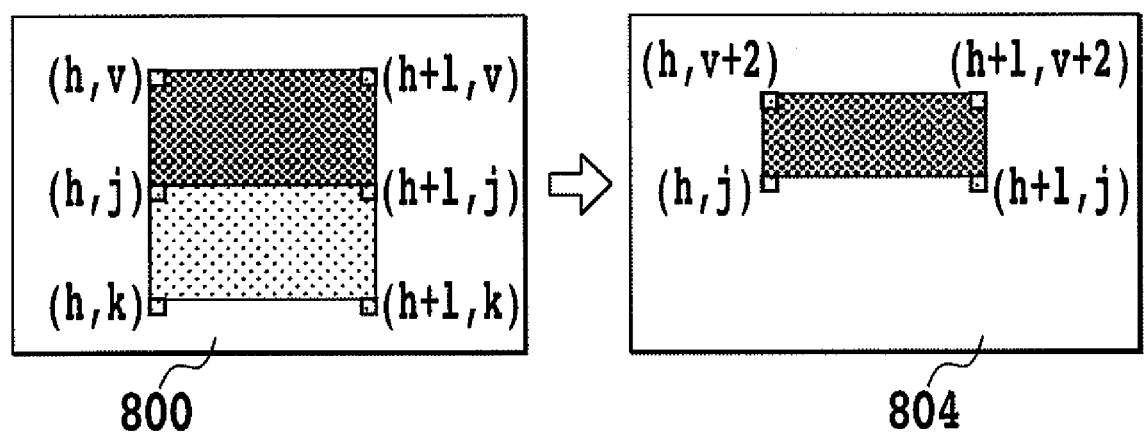
FIGS. 8A and 8B show image processing of the embodiment 1.
Figure 8B:
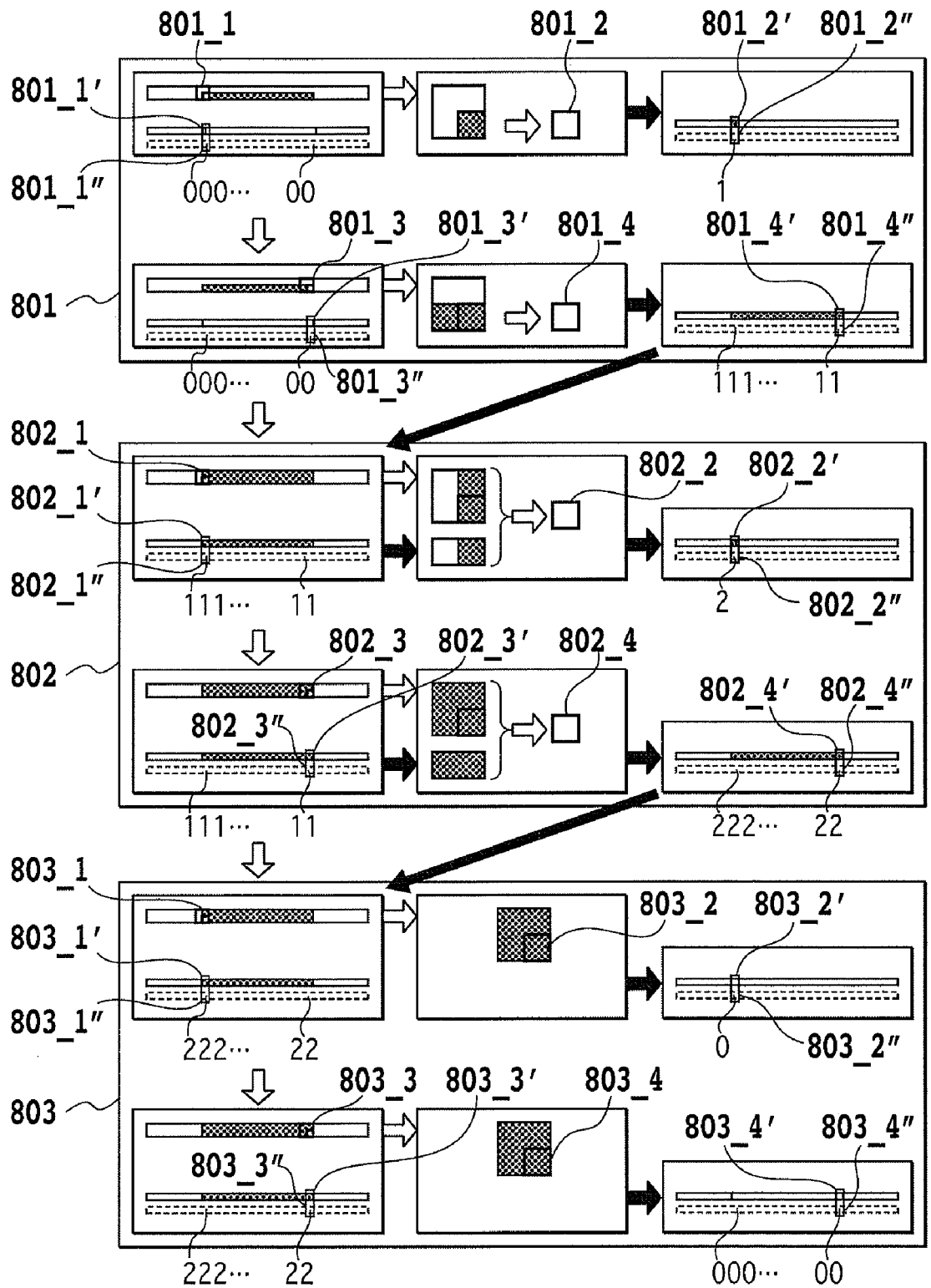

First, the process shown in FIGS. 8A and 8B will be described. The image for which trapping is performed by the process of FIGS. 8A and 8B is an image 800. Here, as an example, densities (pixel values) for the magenta and cyan plates are both set to be 70 with 8 bits (0 to 255).

In the following description, the pixel-of-interest is denoted as pixel (m, n) when it is located at the m-th pixel in the main-scanning direction and the n-th pixel in the sub-scanning direction. The pixel after modification of the pixel (m, n) is denoted as pixel' (m, n), and the modification information of the pixel (m, n) is denoted as modification information (m, n). The modified density included in the modification information (m, n) is denoted as modification density (m, n). In addition, the number of times density modification is performed along the main-scanning direction is denoted as count value H (m, n), and the number of times density modification is performed along the sub-scanning direction is denoted as count value V(m, n).

Here, as an example, it is assumed that the modification information (m, n) includes the count value V(m, n) and the modification density (m, n).

In other words, it is assumed that pixel modification information (m, n)={count value V(m, n)=0, modification density (m, n)=(0,0,0,0)}. Here, modification density (m, n)=(C, M, Y, K) indicates the density of cyan (C), magenta (M), yellow (Y), and black (K) in the pixel (m, n).

The process, described in detail in FIGS. 8A and 8B, of thinning the slant-line area 701_4 of the magenta plate of the image 701_1 of FIG. 7 by the trapping width converts the unprocessed image 800 of FIG. 8A into a processed image 804. In other words, it is a process of thinning the upper part of the magenta plate.

First, in the image 800 of FIG. 8A, a process of thinning the upper part for magenta plate when the pixel-of-interest is located in a range from (h,v) to (h+l,v) will be described below, referring to a process 801.

FIG. 2 shows a flow chart of the image processing according to the present embodiment.

First, at S201_0 of FIG. 2, the image transformation processing unit 102_2 performs the reference area obtaining process for the pixel-of-interest (h,v) to obtain a 2×2 reference area 801_1.

Next, the image transformation processing unit 102_2 performs the modification information determining process at S201_1 to determine whether the count value V of the modification information corresponding to a pixel in the reference area 801_1 is zero or not (meaning that there is no modification information, hereinafter).

The process flow proceeds to S201_3 if it is determined at S201_1 that there is no modification information, and proceeds to S2012 if it is determined that there is modification information (count value V=1).

Here, the modification information is expressed as follows depending on the modification density 801_1' and the count value V(801_1").

In other words, modification information (h,v−1)={count value V(h,v−1)=0, modification density (h,v−1)=(0,0,0,0)}. This is the modification information that has already been calculated with regard to the pixel (h,v−1).

Here, count value V(h,v−1)=0, and modification density (h,v−1)=(0,0,0,0). Therefore, at S201_1, the image transformation processing unit 102_2 determines that there is no modification information because the count value V(h,v−1) is zero, and the pixel (h,v−1) has not been modified.

Since it is determined that there is no modification information, the process flow proceeds to the reference-area-referring modification process (S201_3).

At S201_3, the image transformation processing unit 102_2 performs the reference-area-referring modification process and modifies the information of the pixel in the reference area. As a result, the density of the magenta plate of the pixel-of-interest is modified to zero, which is the density of the magenta plate of a neighboring pixel, and a pixel 801_2 is obtained.

Here, the density before modification of the pixel-of-interest in the reference area is the pixel (h,v)=(0,70,0,0), and the density after modification of the pixel-of-interest in the reference area is the pixel' (h,v)=(0,0,0,0).

Next, the image transformation processing unit 102_2 performs the modification information update process at S201_4 to update the count value V(h,v) to a count value V(h,v)=1 (801_2"). The image transformation processing unit 102_2 then updates the modification density (h,v), which is the difference between the density before modification and the density after modification, and modification density (h,v)=(0,70,0,0)801_2' is obtained.

Here, modification information (h,v)={count value V(h, v)= 1, modification density (h,v)=(0,70,0,0)} is obtained.

Next, the image transformation processing unit 102_2 shifts the reference area along the main-scanning direction by one pixel. The image transformation processing unit 102_2 then performs the above process on all the pixels along the main-scanning direction.

A reference area 801_3 is the reference area of the last pixel (h+l,v) along the main-scanning direction. A modification density 801_3' is the modification density of the last pixel (h+l,v) along the main-scanning direction. A count value V(801_3") is the count value V of the last pixel (h+l,v) along the main-scanning direction. The image transformation processing unit 102_2 converts the pixel (h+l,v) into the pixel' (h+l,v) as with the pixel (h,v), and a pixel 801_4 is obtained.

Here, the density before modification of the pixel in the reference area is the pixel (h+l,v)=(0,70,0,0), and the density after modification of the pixel in the reference area is the pixel' (h+l,v)=(0,0,0,0).

The image transformation processing unit 1022 then updates the count value V(h+l,v) included in the modification information (h+l,v) to a count value V=1(801_4"). The image transformation processing unit 102_2 updates the modification density (h+l,v) included in the modification information (h+l,v) into the modification density (h+l,v)=(0,70,0,0) 801_4'.

Here, modification information (h+l,v)={count value V(h+l,v)=1, and modification density (h+l,v)=(0,70,0,0)}.

Next, a case where the pixel-of-interest is located in a range from (h,v+1) to (h+l,v+1) will be described, referring to a process 802 of FIG. 8B.

First, at S201_0 of FIG. 2, the image transformation processing unit 102_2 performs the reference area obtaining process for the pixel-of-interest (h,v+1) to obtain a 2×2 reference area 802_1.

Next, the image transformation processing unit 102_2 performs the modification information determining process at S201_1 to determine whether there is modification information for a pixel in the reference area 802_1.

If it is determined at S201_1 that there is no modification information, the process flow proceeds to S201_3, whereas the process flow proceeds to S201_2 if it is determined that there is modification information.

Here, the modification information in the reference area includes a modification density 802_1' and a count value V(802_1") obtained when processing the pixel (h,v), and the count value V(h,v)=1. Therefore, the image transformation processing unit 102_2 determines at S201_1 that there is modification information. The process flow then proceeds to the modification-information-referring modification process (S201_2). The image transformation processing unit 102_2 performs the following process at S201_2.

Specifically, the image transformation processing unit 102_2 compares at S201_2 the register value (threshold value) set by the user from the register setting unit 107 with the count value. If [count value<register value] holds, the image transformation processing unit 102_2 updates the density of the pixel-of-interest to a value calculated by subtracting the modification density from the density of the pixel-of-interest.

The process flow then proceeds to the modification information update process (S201_4).

If, on the other hand, [count value≧register value] holds at S201_2, the image transformation processing unit 102_2 does not modify the density of the pixel-of-interest, and the process flow proceeds to the modification information update process (S201_4).

If, in the present embodiment for example, the register value set by the user is two, [count value V(h,v)=1<register value=2] holds. In this case, therefore, the image transformation processing unit 102_2 updates, at S201_2, the density of the pixel-of-interest to a value calculated by subtracting the modification density from the pixel-of-interest. As a result, the pixel (h,v+1) is modified to a pixel' (h,v+1), and a pixel 802_2 is obtained.

Here, the density before modification of the pixel-of-interest in the reference area is pixel (h,v+1)=(0,70,0,0). By subtracting the modification density (h,v)=(0,70,0,0) from the density before modification of the pixel-of-interest, the density after modification of the pixel-of-interest in the reference area is pixel' (h,v+1)=(0,0,0,0).

The process flow then proceeds to the modification information update process (S201_4).

At S201_4, the image transformation processing unit 102_2 performs the modification information update process to update the count value V(h,v+1) to count value V(h,v+1)=2 (802_2"). The image transformation processing unit 102_2 then updates the modification density (h,v+1) to modification density (h,v+1)=(0,70,0,0)802_2'.

Here, modification information (h,v+1)={count value V(h,v+1)=2, and modification density (h,v+1)=(0,70,0,0)}.

Next, the image transformation processing unit 102_2 performs the unprocessed pixel detection process at S201_5 to determine whether there are any unprocessed pixels.

If it is determined at S201_5 that there is an unprocessed pixel, the process flow proceed to S201_6, whereas the process flow proceeds to S201_7 if it is determined at S201_5 that there is no unprocessed pixel.

The image transformation processing unit 102_2 performs the pixel update process at S201_6 to shift the reference area by one pixel along the main-scanning direction, and the process flow proceeds to S201_0 where the reference area obtaining process is performed. The image transformation processing unit 102_2 repeats this process to perform the process on all the pixels along the main-scanning direction.

As a result, the pixel-of-interest (h+l,v+l) is modified to 802_4 based on the modification density 802_3' and the count value V(802_3") in the reference area 802_3 of FIG. 8B. The modification density included in the modification information is modified to a modification density 802_4', and the count value V included in the modification information is modified to a count value V(802_4").

Subsequently, the image transformation processing unit 102_2 shifts the reference area by one pixel along the sub-scanning direction and performs the reference area obtaining process at S201_0.

Next, a case where the pixel-of-interest is located in a range from (h,v+2) to (h+l,v+2) will be described, referring to a process 803 of FIG. 8B.

First, the image transformation processing unit 102_2 performs the reference area obtaining process at S201_0 to obtain a 2×2 reference area 803_1.

Next, the image transformation processing unit 102_2 performs the modification information determining process at S201_1 to determine whether there is modification information in the reference area 803_1.

If it is determined at S201_1 that there is no modification information, the process flow proceeds to S201_3, whereas the process flow proceeds to S201_2 if it is determined that there is modification information.

Here, the modification information in the reference area includes the modification density 803_1' and the count value V(803_1"), where count value V(h,v+1)=2. Therefore, the image transformation processing unit 102_2 determines at S201_1 that there is modification information. The process flow then proceeds to the modification-information-referring modification process (S201_2). The image transformation processing unit 102_2 then modifies the pixel-of-interest, referring to the modification information (h,v+1) and information set in the register setting unit 107.

However, because [count value V(h,v+1)=2≧register value=2] holds in the present embodiment, the pixel-of-interest is not modified and a pixel 803_2 is obtained. As a result, the density before modification of the pixel-of-interest is pixel (h,v+2)=(0,70,0,0), and the density after modification of the pixel-of-interest is pixel' (h,v+2)=(0,70,0,0).

The process flow then proceeds to the modification information update process (S201_4).

The image transformation processing unit 102_2 performs the modification information update process at S201_4 where the count value V(h,v+2) is reset to zero because the density of the pixel-of-interest has not been modified, which results in a count value V(803_2"). The image transformation processing unit 102_2 then updates the modification density (h,v+2) to a modification density 803_2'.

Here, modification information (h,v+2)={count value V(h, v+2)=0, modification density which is the difference between the densities before and after modification (h,v+2)=(0,0,0,0)} is obtained.

Next, the image transformation processing unit 102_2 performs the unprocessed pixel detection process to determine at S201_5 whether there are any unprocessed pixels.

If it is determined at S201_5 that there is an unprocessed pixel, the process flow proceeds to S201_6, whereas the process flow proceeds to S201_7 if it is determined at S201_5 that there is no unprocessed pixel.

The image transformation processing unit 102_2 performs the pixel update process at S201_6 to shift the reference area by one pixel along the main-scanning direction, and the process flow then proceeds to S201_0 where the reference area obtaining process is performed.

As a result, the pixel-of-interest (h+1,v+2) is modified based on the modification density 803_3' and the count value V(803_3") in the reference area 803_3 of FIG. 8B, and a pixel 803_4 is obtained. The modification density included in the modification information is modified to a modification density 803_4', and the count value V included in the modification information is modified to a count value V(803_4").

Thereafter, the image transformation processing unit 102_2 performs processing on the (v+3)th to the (j−1)th pixels along the sub-scanning direction. On the (v+3)th to the (j−1)th pixels along the sub-scanning direction, a process similar to that described above is repeated.

The density before modification of the pixel (h,j−1) is pixel (h,j−1)=(0,70,0,0), and the density after modification of the pixel (h,j−1) is pixel' (h,j−1)=(0,70,0,0). Also, modification information (h,j−1)={count value V(h,j−1)=0, modification density (h,j−1)=(0,0,0,0)} is obtained.

Figure 9A:
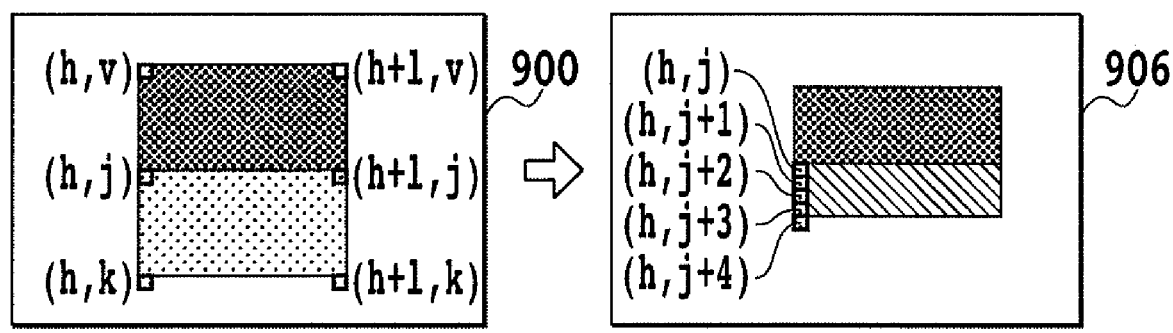
FIGS. 9A and 9B show image processing of the embodiment 1.
Figure 9B:
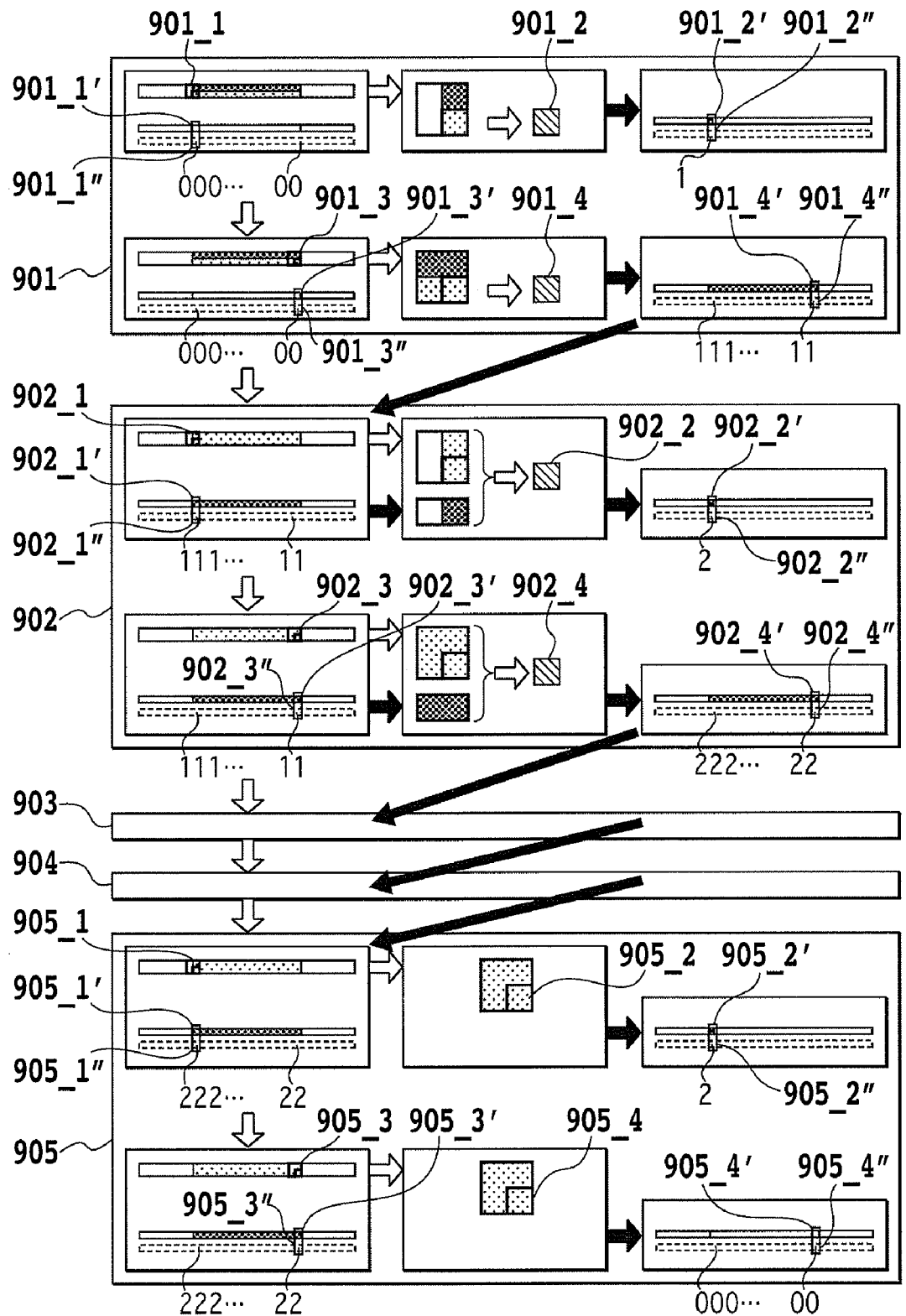

The process shown in FIGS. 9A and 9B will be described. The process shown in FIGS. 9A and 9B thickens, by twice the trapping width, the image in the slant-line area 701_5 of the image 701_2 of FIG. 7 which is the boundary between the magenta and the cyan plates. An image 906 of FIG. 9A is obtained from the image 804 of FIG. 8A by the process shown in FIGS. 9A and 9B.

In the following, a process when the pixel-of-interest is located from (h,j) to (h+1,j) will be described, referring to a process 901 of FIG. 9B.

First, at S201_0 of FIG. 2, the image transformation processing unit 102_2 performs the reference area obtaining process to obtain a 2×2 reference area 901_1 when the pixel-of-interest is located at (h,j).

Next, the image transformation processing unit 102_2 performs the modification information determining process at S201_1 to determine whether there is modification information in the reference area 901_1.

If it is determined at S201_1 that there is no modification information, the process flow proceeds to S201_3, whereas the process flow proceeds to S201_2 if it is determined that there is modification information.

Here, the modification information in the reference area includes a modification density 901_1' and a count value V(901_1"), where count value V(h,j−1)=0. Therefore, the image transformation processing unit 102_2 determines at S201_1 that there is no modification information. The process flow then proceeds to the reference-area-referring modification process (S201_2). The image transformation processing unit 102_2 then performs a process of modifying the information of pixels in the reference area. Here, the image transformation processing unit 102_2 modifies the density of the magenta plate of the pixel-of-interest to 70. As a result, the pixel (h,j) is modified to a pixel' (h,j), whereby a pixel 901_2 is obtained.

Here, the density before modification of the pixel in the reference area is the pixel (h,j)=(70,0,0,0), and the density after modification of the pixel in the reference area is pixel' (h,j)=(70,70,0,0).

Next, the image transformation processing unit 102_2 performs the modification information update process at S201_4 to update the modification density 901_2' and the count value V(901_2") of the modification information to a modification information (h,j)={count value V(h,=1,j), modification density (h,j)=(0,70,0,0)}.

Next, the image transformation processing unit 102_2 performs the unprocessed pixel detection process at S201_5 to determine whether there are any unprocessed pixels.

If it is determined at S201_5 that there is an unprocessed pixel, the process flow proceeds to S201_6, whereas the process flow proceeds to S201_7 if it is determined at S201_5 that there is no unprocessed pixel.

The image transformation processing unit 102_2 performs the pixel update process at S201_6 to shift the reference area by one pixel along the main-scanning direction, and the process flow proceeds to S201_0 where the reference area obtaining process is performed. The image transformation processing unit 102_2 repeats this process to perform the process on all the pixels along the main-scanning direction.

Specifically, when the pixel-of-interest is located at (h+1,j), the image transformation processing unit 102_2 obtains a reference area 901_3.

Next, the pixel of the pixel-of-interest is modified to a pixel 901_4 based on the modification density 901_1' and the count value V(901_1"), which are the modification information in the reference area. The modification density included in the modification information is set to a modification density 901_4' and the count value included in the modification information is set to a count value V(901_4").

Subsequently, the image transformation processing unit 102_2 advances the reference area by one pixel along the sub-scanning direction, and performs a processing on the pixel-of-interest (h,j+1).

At S201_0 of FIG. 2, the image transformation processing unit 102_2 performs the reference area obtaining process on the pixel-of-interest (h,j+1) to obtain a 2×2 reference area 902_1.

Next, the image transformation processing unit 102_2 performs the modification information determining process at S201_1 to determine whether there is modification information in the reference area.

If it is determined at S201_1 that there is no modification information, the process flow proceeds to S201_3, whereas the process flow proceeds to S201_2 if it is determined that there is modification information.

Here, the modification information in the reference area is the modification density 902_1' and the count value V(902_1"), where count value V(h,j)=1. Therefore, the image transformation processing unit 102_2 determines that there is modification information at S201_1. The process flow then proceeds to the modification-information-referring modification process (S201_2).

The image transformation processing unit 102_2 performs at S201_2 a process of modifying the information of pixels in the reference area. Since density of the magenta plate exists in the modification density and density of the cyan plate exists for the pixel-of-interest, the image transformation processing unit 102_2 determines that a trapping process is being performed and doubles the register value (threshold value).

The density of the pixel-of-interest is updated, because [count value V(h,j+1)=2≦register value×2=4] holds in this case. As a result, the pixel (h,j+1) is modified to a pixel' (h,j+1), and a pixel 902_2 is obtained. Here, the density of the pixel-of-interest before modification is pixel (h,j+1)=(70,0,0, 0), whereas the density of the pixel-of-interest after modification is pixel' (h,j+1)=(70,70,0,0).

The process flow then proceeds to the modification information update process (S201_4).

Next, the image transformation processing unit 102_2 performs the modification information update process at S201_4 to update the modification density included in the modification information to a modification density 902_2' and update the count value V included in the modification information to a count value V(902_2"). Here, modification information (h,j+1)={count value V(h,j+1)=2, modification density (h,j+1)=(0,70,0,0)}.

Next the image transformation processing unit 102_2 performs the unprocessed pixel detection process at S201_5 to determine whether there are any unprocessed pixels.

If it is determined at S201_5 that there is an unprocessed pixel, the process flow proceeds to S201_6, whereas the process flow proceeds to S201_7 if it is determined at S201_5 that there is no unprocessed pixel.

The image transformation processing unit 102_2 performs the pixel update process at S201_6 to shift the reference area by one pixel along the main-scanning direction, and the process flow proceeds to S201_0 where the reference area obtaining process is performed. The image transformation processing unit 102_2 repeats this process to perform the process on all the pixels along the main-scanning direction.

Specifically, the image transformation processing unit 102_2 obtains a reference area 902_3 when the pixel-of-interest is located at (h+1,j+1).

Next, the image transformation processing unit 102_2 modifies the density of the pixel-of-interest based on a modification density 902_3' and a count value 902_3" which are the modification information in the reference area, and a pixel 902_4 is obtained.

The image transformation processing unit 102_2 then updates the modification information. In other words, the image transformation processing unit 102_2 updates the modification density to a modification density 902_4' and updates the count value to a count value V(902_4").

Next, the image transformation processing unit 102_2 shifts the reference area by one pixel along the sub-scanning direction, performs the same process on the pixels-of-interest (h,j+2) to (h+1,j+2) in a process 903. Furthermore, the image transformation processing unit 102_2 performs the same process in a process 904 also when the pixels-of-interest are located at (h,j+3) to (h+1,j+3).

Specifically, the image transformation processing unit 102_2 performs the reference area obtaining process at S201_0 on the pixel-of-interest (h,j+2) to obtain a 2×2 reference area.

Next, the image transformation processing unit 102_2 performs the modification information determining process at S201_1 to determine whether there is modification information in the reference area.

If it is determined at S201_1 that there is no modification information, the process flow proceeds to S201_3, whereas the process flow proceeds to S201_2, if it is determined that there is modification information.

Here, the count value in the reference area V(h,j−1)=2. Therefore, the image transformation processing unit 102_2 determines at S201_1 that there is modification information. The process flow then proceeds to the modification-information-referring modification process (S201_2). Here, the image transformation processing unit 102_2 modifies the pixel-of-interest, referring to the modification information (h,j+1) and the information set in the register setting unit 107.

Here, the image transformation processing unit 102_2 determines that the trapping process is being performed because there is the density of the magenta plate in the modification density and the density of the cyan plate exists for the pixel-of-interest, and doubles the register value (threshold value).

Since [count value V(h,j+1)=2≦register value×2=4] holds in this case, the image transformation processing unit 102_2 modifies the pixel-of-interest. In other words, the image transformation processing unit 102_2 performs a process on a pixel-of-interest (h,j+2) similar to that on the pixel-of-interest (h,j+1).

Here, the density before modification of the pixel-of-interest is pixel (h,j+2)=(70,0,0,0), and the density after modification of the pixel-of-interest is pixel' (h,j+2)=(70,70,0,0). The process flow then proceeds to the modification information update process (S201_4).

Next, the image transformation processing unit 102_2 performs the modification information update process at S201_4 to update the modification information to a modification information (h,j+2)={modification density (h,j+2)=(0,70,0,0), count value V(h,j+2)=3}.

The image transformation processing unit 102_2 then performs this process on pixels (h+1,j+2) to (h+1,j+2).

Similarly, the image transformation processing unit 102_2 modifies the density before modification, i.e. pixel (h,j+3)=(70,0,0,0), so that the density after modification becomes pixel' (h,j+3)=(70,70,0,0), for the pixel-of-interest (h,j+3). Here, modification information (h,j+3)={modification density (h,j+3)=(0,70,0,0), count value V(h,j+3)=4}.

The image transformation processing unit 102_2 then performs this process on pixels (h+1,j+2) to (h+1,j+2).

Finally, in a process 905, the following process is performed on a pixel-of-interest (h,j+4).

First, the image transformation processing unit 102_2 obtains a 2×2 reference area 905_1, and refers to a modification density 905_1' and a count value V(905_1"), which are the modification information in the reference area.

Modification of the pixel is completed here because the count value is given by [count value V(h,j+3)=4≦register value×2=4].

In other words, the density before modification is pixel (h,j+4)=(70,0,0,0) with regard to the pixel-of-interest, thus no modification is performed to provide a density after modification pixel' (h,j+4)=(70,0,0,0), and a pixel 905_2 is obtained.

Additionally, modification information (h,j+4)={modification density (h,j+4)=(0,0,0,0), count value V(h,j+4)=0} is obtained from a modification density (h,j+4) 905_2' and a count value V(h,j+4)905_2".

The image transformation processing unit 102_2 performs a similar process on pixels (h+1,j+4) to (h+1,j+4).

The image transformation processing unit 102_2 refers to, similarly for a pixel-of-interest (h+1,j+4), a modification density 905_3' and a count value V(905_3"), which are the modification information in the reference area 905_3. Again, the image transformation processing unit 102_2 does not perform modification of the pixel because [count value V(h+1,j+3)=4≦register value×2=4] holds.

In other words, the density before modification is given by pixel (h+1,j+4)=(70,0,0,0) with regard to the pixel-of-interest, thus no modification is performed to provide a density after modification pixel' (h+1,j+4)=(70,0,0,0), and a pixel 905_4 is obtained.

Additionally, modification information (h+1,j+4)={modification density (h+1,j+4)=(0,0,0,0), count value V(h+1,j+4)=0} is obtained from a modification density (h+1,j+4) 905_4' and a count value V(h+1,j+4)905_4".

The above process gives an image 906 of FIG. 9A.

Figure 10A:
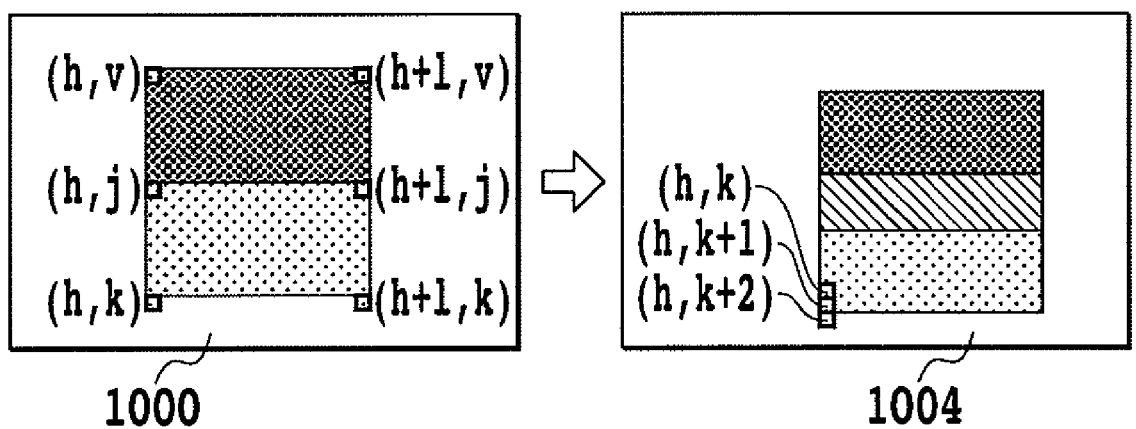
FIGS. 10A and 10B show image processing of the embodiment 1.
Figure 10B:
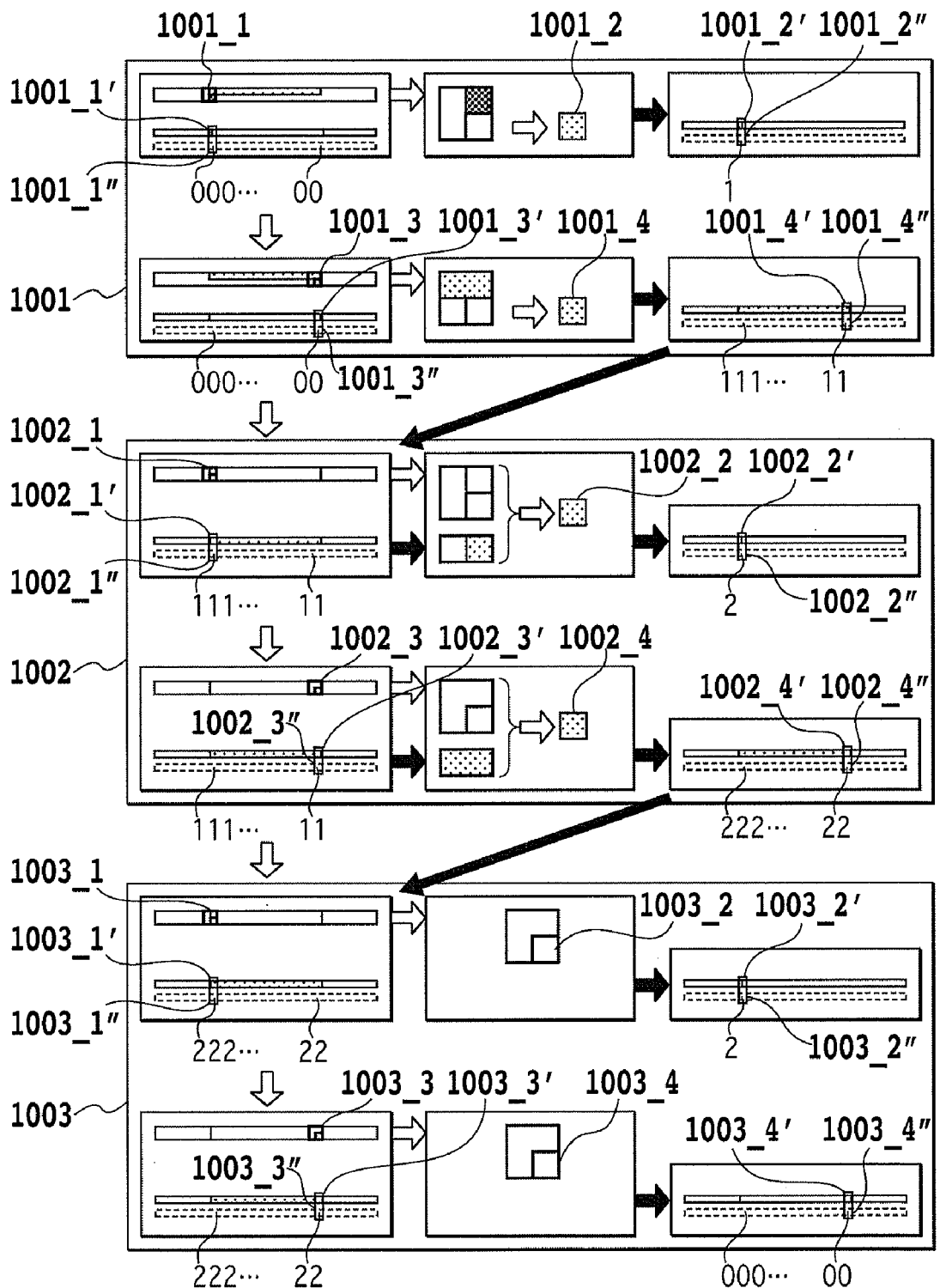

The process shown in FIGS. 10A and 10B will be described below. The process shown in FIGS. 10A and 10B thickens, by the trapping width, the image in the slant-line area 701_6 of the cyan plate of the image 701_3 of FIG. 7. An image 1004 of FIG. 10A is obtained from the image 906 of FIG. 9A by the process shown in FIGS. 10A and 10B.

First, a process on pixels-of-interest located at (h,k) to (h+1,k) will be described, referring to a process 1001 of FIG. 10B.

First, the image transformation processing unit 102_2 performs, at S201_0 of FIG. 2, the reference area obtaining process on the pixel-of-interest (h,k) to obtain a 2×2 reference area 1001_1.

Next, the image transformation processing unit 102_2 performs the modification information determining process at S201_1 to determine whether there is modification information in the reference area.

If it is determined at S201_1 that there is no modification information, the process flow proceeds to S201_3, whereas the process flow proceeds to S201_2 if it is determined that there is modification information.

Here, modification information (h,k−1)={count value V(h,k−1)=0, modification density (h,k−1)=(0,0,0,0)} is obtained from a modification density 1001_1' and a count value V1001_1".

Here, the image transformation processing unit 102_2 determines at S201_1 that there is no modification information, because the count value V(h,k−1)=0 and the modification density (h,k−1)=(0,0,0,0). The process flow then proceeds to the reference-area-referring modification process (S201_3).

The image transformation processing unit 102_2 performs the reference-area-referring modification process at S201_3 to modify the density of the pixel-of-interest in the reference area to 70, and obtains a pixel 1001_2. Here, the density before modification of the pixel-of-interest is pixel (h,k)=(0,0,0,0), and the density after modification of the pixel-of-interest is pixel' (h,k)=(70,0,0,0).

Next, the image transformation processing unit 102_2 performs the modification information update process at S201_4 to update the count value V(h,k) to a count value V(1001_2"), and updates the modification density (h,k) to a modification density 1001_2'. Here, modification information (h,k)={count value V(h,k)=1, modification density (h,k)=(70,0,0,0)}.

Next, the image transformation processing unit 102_2 shifts the reference area by one pixel along the main-scanning direction, performs the reference area obtaining process (S201_0), and performs a similar process on all the pixels along the main-scanning direction.

In other words, the image transformation processing unit 102_2 performs modification on the pixel-of-interest (h+1,k), referring to a modification density 1001_3' and a count value V(1001_3") included in the modification information in a reference area 1001_3.

As a result, the density before modification is pixel (h+1,k)= (0,0,0,0), and the density after modification is pixel' (h+1,k)= (70,0,0,0) for the pixel-of-interest (h+1,k), as shown in a pixel 1001_4.

Additionally, modification information (h+1,k)={count value V(h+1,k)=1, modification density (h+1,k)=(70,0,0,0)} is obtained from a modification density 1001_4' and a count value V(1001_4").

Next, a process 1002 for pixels-of-interest located at (h,k+1) to (h+1,k+1) will be described.

First, the image transformation processing unit 102_2 performs, at S201_0 of FIG. 2, the reference area obtaining process for the pixel-of-interest (h,k+1) to obtain a 2×2 reference area 1002_1.

Next, the image transformation processing unit 102_2 performs the modification information determining process at S201_1, to determine whether there is modification information in the reference area.

If it is determined at S201_1 that there is no modification information, the process flow proceeds to S201_3, whereas the process flow proceeds to S201_2 if it is determined that there is modification information.

The image transformation processing unit 102_2 performs modification, referring to a modification density 1002_1' and a count value V(1002_1"), which are the modification information of the pixel-of-interest in the reference area 1002_1. At S201_1, the image transformation processing unit 102_2 performs the modification information determining process. Here, because count value V(h,k)=1 holds when referring to the count value V(1002_1"), the image transformation processing unit 102_2 determines at S201_1 that there is modification information. The process flow then proceeds to the modification-information-referring modification process (S201_2).

At S201_2, the image transformation processing unit 102_2 performs the modification-information-referring modification process. Here, because [count value V(h,k)= 1<register value (threshold value)=2] holds, the density of the pixel-of-interest is updated according to the modification density. As a result, the density before modification is pixel (h,k+1)=(0,0,0,0) and the density after modification is pixel' (h,k+1)=(70,0,0,0), as shown in a pixel 1002_2, for the pixel-of-interest (h,k+1). The process flow then proceeds to the modification information update process (S201_4).

The image transformation processing unit 102_2 performs the modification information update process at S201_4 to update the modification density (h,k+1) to a modification density 1002_2' and updates the count value V(h,k+1) to a count value V(1002_2").

In other words, modification information (h,k+1)={count value V(h,k+1)=2, modification density (h,k+1)=(70,0,0,0)} is obtained.

Next the image transformation processing unit 102_2 performs the unprocessed pixel detection process at S201_5 to determine whether there are any unprocessed pixels.

If it is determined at S201_5 that there is an unprocessed pixel, the process flow proceeds to S201_6, whereas the process flow proceeds to S201_7 if it is determined at S201_5 that there is no unprocessed pixel.

The image transformation processing unit 102_2 performs the pixel update process at S201_6 to shift the reference area by one pixel along the main-scanning direction, and the process flow proceeds to S201_0 where the reference area obtaining process is performed. In this manner, the image transformation processing unit 102_2 performs the process on all the pixels along the main-scanning direction.

Modification is performed on the pixel-of-interest (h+l,k+1), referring to the modification density 1002_1' and the count value V(1002_1") included in the modification information in a reference area 1002_3.

As a result, the density before modification is pixel (h+l, k+1)=(0,0,0,0) and the density after modification is pixel' (h+l,k+1)=(70,0,0,0), as shown in a pixel 1002_4, for the pixel-of-interest (h+l,k+1).

The image transformation processing unit 102_2 then updates the modification density included in the modification information to a modification density (1002_4') and updates the count value V included in the modification information to a count value V(1002_4").

Subsequently, the image transformation processing unit 102_2 shifts the reference area by one pixel along the sub-scanning direction, and advances the process flow to the reference area obtaining process (S201_0).

Finally, a process on pixels-of-interest located at (h,k+2) to (h+l,k+2) will be described, referring to a process 1003 of FIG. 10B.

First, the image transformation processing unit 102_2 performs the reference area obtaining process at S201_0 of FIG. 2 to obtain a 2×2 reference area 1003_1 for the pixel-of-interest (h,k+2).

Next, the image transformation processing unit 102_2 performs the modification information determining process at S201_1 to determine whether there is modification information in the reference area.

If it is determined at S201_1 that there is no modification information, the process flow proceeds to S201_3, whereas t the process flow proceeds to S201_2 if it is determined that there is modification information.

Here, the modification information in the reference area 1003_1 is a modification density 1003_1' and a count value 1003_1".

Here, the count value V(1003_1") in the reference area is count value V(h,k+1)=2. Therefore, the image transformation processing unit 102_2 determines that there is modification information and the process flow proceeds to the modification-information-referring modification process (S201_2).

At S201_2, the image transformation processing unit 102_2 refers to the modification information (h,k+1) and information set in the register setting unit 107 (register value (threshold value)). Here, the image transformation processing unit 102_2 does not modify the pixel-of-interest (h,k+2) because [count value V(h,k+1)=2≦register value=2] holds. Here, the density before modification of the pixel-of-interest is pixel (h,k+2)=(0,0,0,0) and the density after modification of the pixel-of-interest is pixel' (h,k+2)=(0,0,0,0), as shown in a pixel 1003_2.

Next, the image transformation processing unit 102_2 performs the modification information update process at S201_4 to update the modification density (h,k+2) to a modification density 1003_2' and updates the count value V(h,k+2) to a count value V(1003_2").

Here, modification information (h,k+2)={count value V(h, k+2)=0, modification density (h,k+2)=(0,0,0,0)}.

Next, the image transformation processing unit 102_2 performs the unprocessed pixel detection process at S201_5 to determine whether there are any unprocessed pixels.

If it is determined at S201_5 that there is an unprocessed pixel, the process flow proceeds to S201_6, whereas the process flow proceeds to S201_7 if it is determined at S201_5 that there is no unprocessed pixel.

The image transformation processing unit 102_2 performs the pixel update process at S201_6 to shift the reference area by one pixel along the main-scanning direction, and advances the process flow to S201_0 where the reference area obtaining process is performed. The image transformation processing unit 102_2 repeats this process to perform the process on all the pixels along the main-scanning direction.

The image transformation processing unit 102_2 performs modification, referring to the modification density 1003_1' and the count value V(1003_1") in a reference area 1003_3 when the pixel-of-interest is located at (h+l,k+2).

As a result, the density before modification is pixel (h+l, k+2)=(0,0,0,0) and the density after modification is pixel' (h+l,k+2)=(70,0,0,0), as shown in a pixel 1003_4, for the pixel-of-interest (h+l,k+2).

The image transformation processing unit 102_2 then updates the modification density to a modification density (h+l,k+2) 1003_4' and updates the count value V(h+l,k+2) to a count value V(h+l,k+2)=0(1003_4").

The above process gives the image 1004 of FIG. 10A, or the image 702 of FIG. 7.

When the image transformation processing unit 102_2 performs the unprocessed pixel detection process at S201_5 to determine that there is no unprocessed pixel left, the process flow proceeds to the shift process (S201_7).

The image transformation processing unit 102_2 performs the shift process at S201_7 to shift the write timing based on the register setting value, and writes the image. Since the register value is set to be two, for example, in the present embodiment, the image transformation processing unit 102_2 writes the image while shifting it by two pixels along the sub-scanning direction, and the image 703 of FIG. 7 is obtained. The image 703 is the desired image obtained by performing the process 701 and the shift process on the image 700.

The memory required in the present embodiment is the sum of the memory preserving the reference area and the memory preserving the modification information. Assuming an 8-bit image, the memory required for preserving the reference area is an 8-bit×1-line memory except for the line including the pixel-of-interest, in the case of a 2×2 reference area, for example. With regard to the memory required for preserving the modification information, the modification density 801_1 of the modification information has 8 bits, and thus an 8-bit×1-line memory is required for preserving the modification density 801_1'. The count information V(801_1") of the modification information has 2 bits, and thus a 2-bit×1-line memory is required for preserving the count information V(801_1").

In summary, with the embodiment 1, an 8-bit×1-line memory is required for the reference area, an 8-bit×1-line memory is required for the modification density of the modification information, and a 2-bit×1-line memory is required for the count value of the modification information. The amount of memory required by the embodiment 1 is shown in FIG. 16 as 2+α lines.

Prior art requires a memory size twice the pixel width (trapping width) specified by the user, as shown in FIG. 16. For example, assuming the pixel width to be two pixels, prior art requires an 8-bit×4-line memory for the reference area.

Therefore, as shown in FIG. 16, it can be seen that the present embodiment requires a smaller memory size than prior art.

Furthermore, the present embodiment has the following effect when the pixel width (trapping width) specified by the user is four pixels. In other words, it is not necessary to change the memory to be obtained for comparing the number of the pixels specified by the user with the count value sequentially updated with the pixels being modified in the modification information determining process (S201_1).

In the present embodiment, therefore, an 8-bit×1-line memory is required for the reference area, an 8-bit×1-line memory is required for the modification density of the modification information, and a 2-bit×1-line memory is required for the count value of the modification information.

With prior-art, on the other hand, an 8-bit×8-line memory is required for the reference area because a memory size twice the pixel width (trapping width) specified by the user is required as shown in FIG. 16.

As shown in FIG. 16, the larger the pixel width (trapping width) specified by the user is, the larger the difference becomes between the memory required by prior art and the memory required by the embodiment 1. Although the modification density of the modification information has been described as an 8-bit×1-line, a line memory corresponding to the pixel width specified by the user may be obtained for the modification density of the modification information. In that case, the embodiment 1 can exhibit the same effect as that of prior art with about half the memory size in prior-art.

Additionally, in the present embodiment, because the pixel-of-interest can be modified at the opposite side of the processing direction from the pixel-of-interest, the problem of prior-art 2 that [modification of the pixel-of-interest can only be performed in the processing direction from the pixel-of-interest] can be solved by the present embodiment.

Although the process is performed assuming that pixel lines exist along the main-scanning direction in the embodiment, the process may be performed assuming that pixel lines exist along the sub-scanning direction.

In addition, the size of the reference area is not limited to that shown in the present embodiment. For example, the image transformation processing unit 102_2 may obtain a 5×2(main-scanning×sub-scanning), instead of a 2×2(main-scanning×sub-scanning), reference area.

Embodiment 2

In the foregoing, it has been able to show a normal modification by preserving modification information of a I-line image for a 2-pixel image modification when the density is constant across a plurality of lines along the sub-scanning direction as with the embodiment 1. However, in the case of a gradation where the density differs for each pixel, data corresponding to one line will be lost if image modification information can only be preserved for a single line for a 2-pixel image modification. If the density of the target image is constant, it suffices to preserve the modification information and only count the number of modified pixels. However, when the target image is gradation, the modification information can only be preserved for one line and data exceeding that will be lost.

This may be tolerable if high-fidelity reproduction is not required by a printer with a poor tone reproduction, but it is fatal if high-fidelity reproduction is required by a printer with a rich tone reproduction.

Therefore, for enabling reproduction without loss of data when tone reproduction is required, it is necessary to preserve a line memory corresponding to the width of pixels, such as trapping, preliminarily specified by the user.

In this occasion, the condition of whether or not to continue modification in the modification process is given below. In the embodiment 1, an object having a constant density is divided into three patterns, i.e., the upper, lower, and trap parts in the modification process of S201_2 and S201_3, for which modification is terminated respectively with a condition that count value≧threshold value.

If, however, the pixel-of-interest does not match the preservation information in the gradation area only with the condition count value≧threshold value, the temporarily preserved information has not yet been reflected in the image.

Therefore, other than the condition count value threshold value, it is necessary to add to the condition whether there is preserved information for preserving a line memory corresponding to a specified width of pixels. Description will be provided below with an example.

In the following, a process that performs trapping of two pixels will be described when there are gradation areas A, B and C in the magenta plate such as in the image 1100 of FIG. 11. Here, the gradation areas A, B and C are, respectively, gradation that varies for each pixel by a density of 10 along the sub-scanning direction.

In the embodiment 2, the flow of process performed by the image transformation processing unit 102_2 is as follows.

First, the image transformation processing unit 102_2 performs a process of thinning the upper part of the image of the magenta plate and performs, in a process 1101, a process of thickening a pixel twice the specified trapping width at the boundary region between the magenta and cyan plates.

The image transformation processing unit 102_2 then performs a process of also thickening the lower part of the cyan plate, and generates an output image.

Subsequently, the image transformation processing unit 102_2 generates a desired image by shifting the writing timing by a desired width along the main-scanning direction.

For example, the desired width is the same number of pixels as that of the information (register value (threshold value)) set in the register setting unit 107.

In the following, a process relating to the embodiment 2 and different from the embodiment 1 will be described with regard to FIG. 11.

The flow of process performed by the image transformation processing unit 102_2 in the embodiment 2 will be described concretely below.

Figure 11:
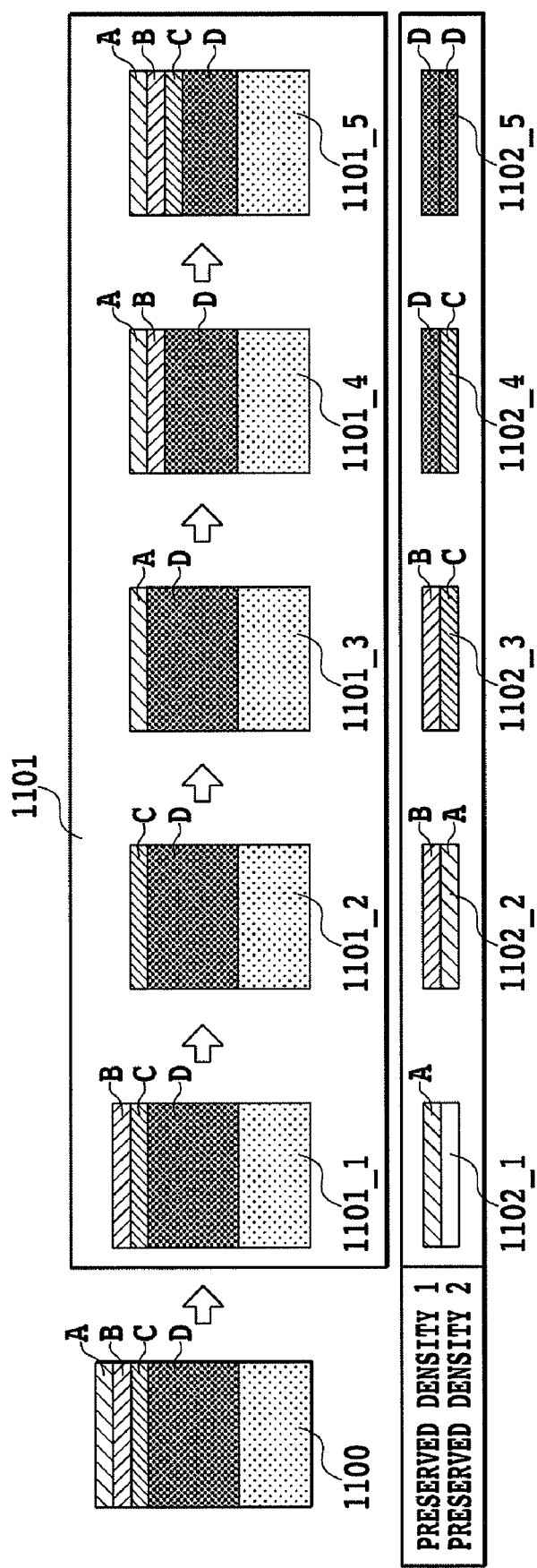
FIG. 11 shows image processing of the embodiment 2.
Figure 17A:
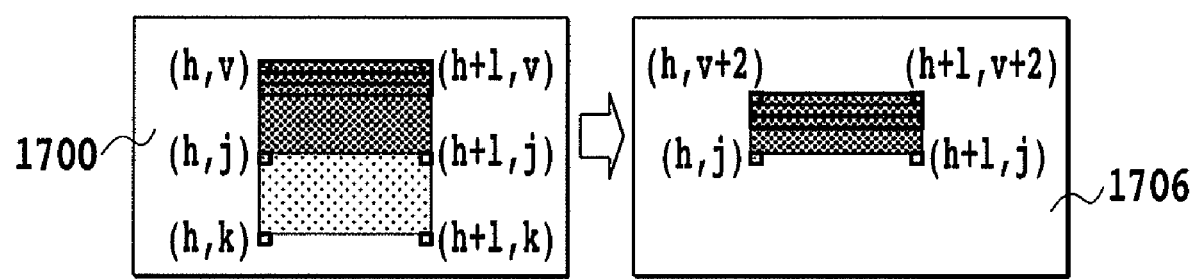
FIGS. 17A and 17B are explanatory views for illustrating the process in the embodiment 2.
Figure 17B:
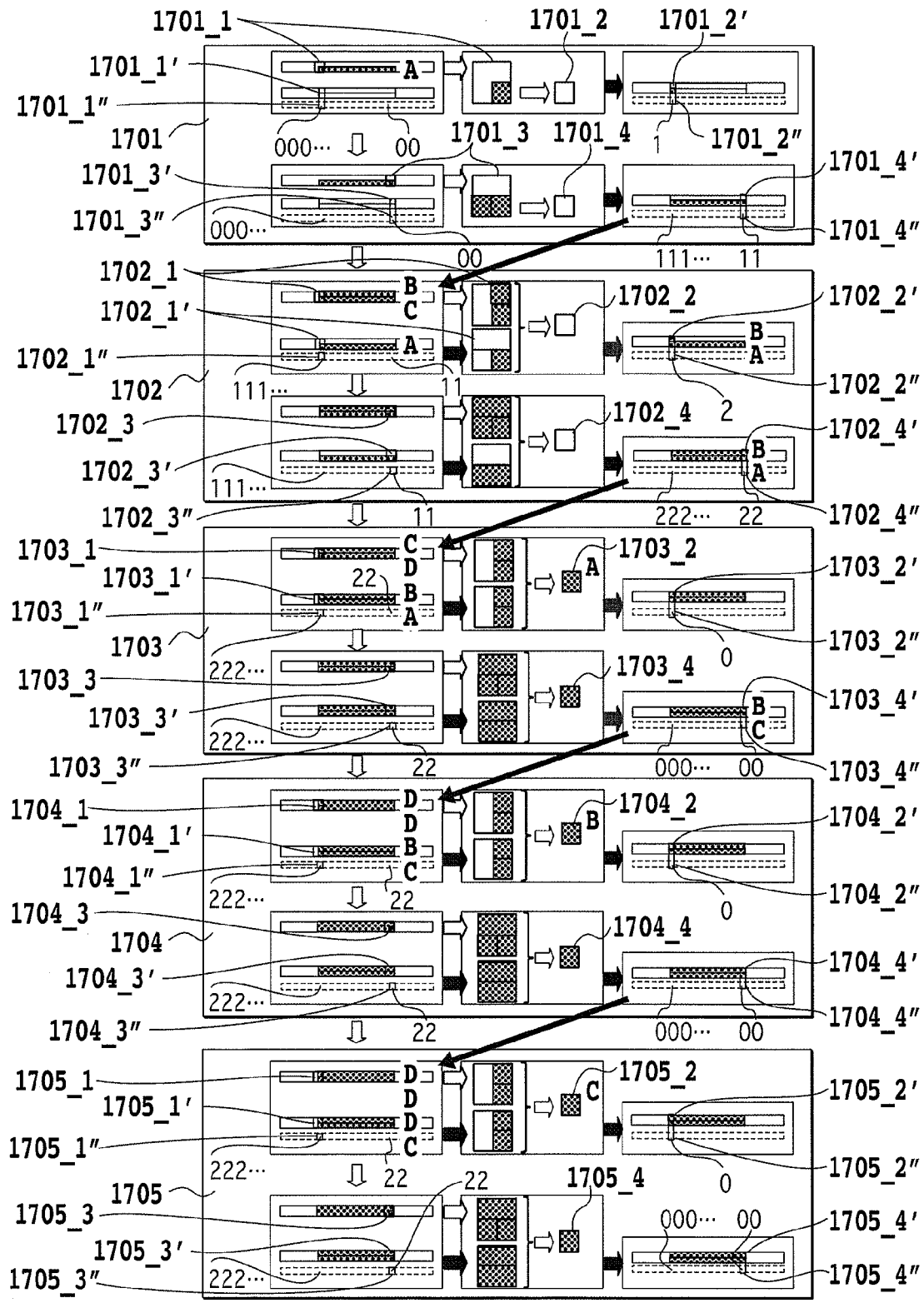

As shown in the process 1101 of FIG. 11 whose details are shown in FIGS. 17A and 17B, the image transformation processing unit 102_2 performs a process of shifting the pixels of gradation along the sub-scanning direction. In other words, it is a process of converting an image 1700 of FIG. 17A into a processed image 1706, i.e., a process of shifting each pixel by the trapping width.

First, the process of shifting the pixels of gradation along the sub-scanning direction when the pixels-of-interest are located at (h,v) to (h+l,v) in the image 1700 of FIG. 17A will be described below, referring to a process 1701.

First, the image transformation processing unit 102_2 performs the reference area obtaining process at S201_0 of FIG. 2 to obtain a 2×2 reference area 1701_1 for the pixel-of-interest (h,v) in an image 1101_1.

Next, the image transformation processing unit 102_2 performs the modification information determining process at S201_1 to determine whether there is modification information in the reference area 1701_1.

If it is determined at S201_1 that there is no modification information, the process flow proceeds to S201_3, whereas the process flow proceeds to S201_2 it is determined that there is modification information.

Here, the modification information (h,v−1) is expressed as follows using pixel preservation information 1701_1' and a count value V(1701_1").

In other words, modification information (h,v−1)={count value V(h,v−1)=0 and pixel preservation information (h,v−1)}.

Additionally, in the present embodiment, pixel information to be preserved is given as the pixel preservation information (h,v−1) described above.

Here, the pixel preservation information (h,v−1)={preserved density 1($h,v$−1)=(0,0,0,0), preserved density 2($h,v$−2)=(0,0,0,0)}. The pixel preservation information, assuming that the width specified by the user has two pixels, for example, includes two preserved densities. In addition, the preserved density has a role of preserving the original pixel density, as well as a role of the modification density of the embodiment 1.

As discussed above, in the modification information (h,v−1), count value V(h,v−1)=0, preserved density 1($h,v$−1)=(0,0,0,0), and preserved density 2($h,v$−2)=(0,0,0,0).

Therefore, the image transformation processing unit 102_2 determines that there is no modification information due to count value V=0, and the process flow proceeds to the reference-area-referring modification process (S201_3).

The image transformation processing unit 102_2 performs the reference-area-referring modification process at S201_3, as with the embodiment 1, the density of the pixel-of-interest in the reference area is modified to zero, and a pixel 1701_2 is obtained.

Although the density before modification of the pixel-of-interest is pixel (h,v)=(0,40,0,0), the density after modification of the pixel-of-interest becomes pixel' (h,v)=(0,0,0,0), as a result of the process of S201_3.

Next, the image transformation processing unit 102_2 performs the modification information update process at S201_4 to update the count value V(h,v) to a count value V(h,v)=2 (1701_2").

That is, as a result, modification information (h,v)={count value V(h,v)=1 and pixel preservation information (h,v)}. Additionally, as shown in the preserved density 1102_1 of FIG. 11, pixel preservation information (h,v)={preserved density 1($h,v$)=(0,40,0,0) and preserved density 2($h,v$−1)=(0,0,0,0)}.

The image transformation processing unit 102_2 thus preserves the modification information.

Next, the image transformation processing unit 102_2 performs the unprocessed pixel detection process at S201_5 to determine whether there are any unprocessed pixels.

If it is determined at S201_5 that there is an unprocessed pixel, the process flow proceeds to S201_6, whereas the process flow proceeds to S201_7 if it is determined at S201_5 that there is no unprocessed pixel.

The image transformation processing unit 102_2 performs the pixel update process at S201_6 to shift the reference area by one pixel along the main-scanning direction, and advances the process flow to S201_0 where the reference area obtaining process is performed. The image transformation processing unit 102_2 repeats the process to perform the process on all the pixels along the main-scanning direction.

Here, the reference area 1701_3 is the reference area of the last pixel (h+l,v) along the main-scanning direction. The modification density 1701_3' is the modification density of the last pixel (h+l,v) along the main-scanning direction. Additionally, the count value V(1701_3") is the count value V of the last pixel (h+l,v) along the main-scanning direction. The image transformation processing unit 102_2 modifies the pixel (h+l,v) into a pixel' (h+l,v) similarly to the pixel (h,v), and a pixel 1701_4 is obtained.

As a result, although the density before modification is pixel (h+l,v)=(0,40,0,0) for the pixel-of-interest (h+l,v), the density after modification becomes pixel' (h+l,v)=(0,0,0,0). In addition, modification information (h+l,v)={count value V(h+l,v)=1(1701_4") and pixel preservation information (h+l,v)1701_4'}. Furthermore, pixel preservation information (h+l,v)={preserved density 1($h+l,v$)=(0,40,0,0) and preserved density 2($h+l,v$−1)=(0,0,0,0)}.

Figure 6:
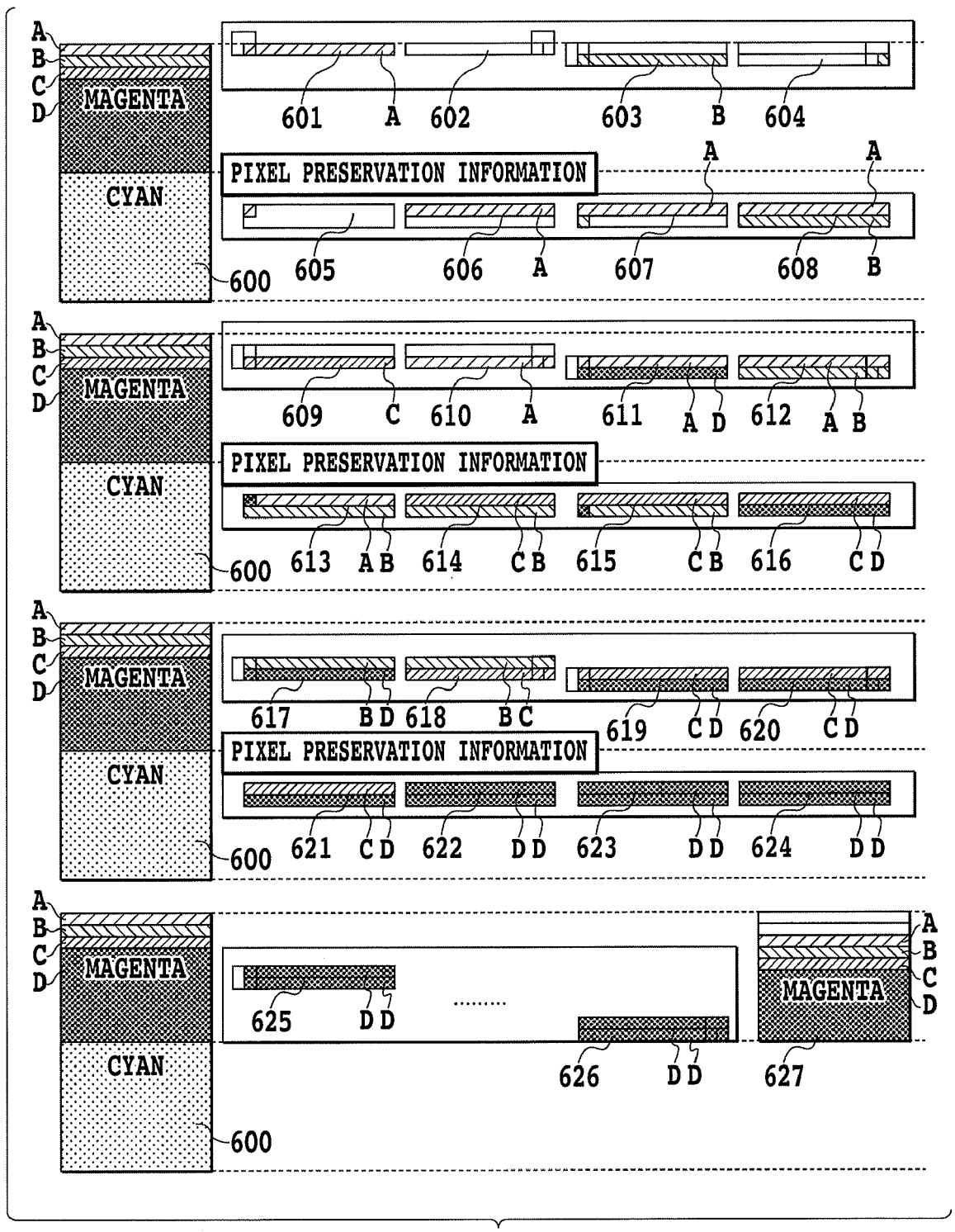
FIG. 6 shows image processing of an embodiment 2.

The pixels' (h,v) to (h+l,v) obtained as the result of the above process are shown in the images 601 and 602 of FIG. 6. In addition, the pixel preservation information (h,v) to (h+l,v) is shown in the images 605 and 606 of FIG. 6.

On the other hand, the result of output after processing the pixels located at (h,v) to (h+l,v) by the image transformation processing unit 102_2 is shown in the image 1101_1 of FIG. 11, and the preserved densities 1 and 2 of that case are shown in an image 1102_1 of FIG. 11.

Next, the image transformation processing unit 102_2 performs the reference area obtaining process at S201_0 of FIG. 2 to obtain a 2×2 reference area 1702_1 for the pixel-of-interest (h,v+1).

Next, the image transformation processing unit 102_2 performs the modification information determining process at S201_1 to determine whether there is modification information in the reference area 1702_1.

If it is determined at S201_1 that there is no modification information, the process flow proceeds to S201_3, whereas the process flow proceeds to S201_2 if it is determined that there is modification information.

Here, the image transformation processing unit 102_2 determines at S201_1 that there is modification information because the count value V(h,v)=1(1702_1") in the reference area.

Therefore, the process flow proceeds to the modification-information-referring modification process (S201_2), where the following process is performed.

The image transformation processing unit 102_2 compares the register value set by the user with the count value. In the present embodiment, for example, the register value set by the user is two, and [count value V(h,v+1)=1<register value=2], the image transformation processing unit 102_2 advances the modification process of the pixel-of-interest.

Here, the image transformation processing unit 102_2 performs a process of exchanging the density the pixel-of-interest with the preserved density 2($h,v$).

Specifically, the density before modification of the pixel-of-interest is pixel (h,v+1)=(0,50,0,0), whereas the density after modification of the pixel-of-interest becomes pixel' (h,v+1)-(0,0,0,0). The preserved density 2($h+l,v$−1)-(0,50,0,0) is also obtained.

Next, the image transformation processing unit 102_2 performs the modification information update process at S201_4 to update the count value V(h,v+1) to a count value V(h,v+1)=1(1702_2"). The image transformation processing unit 102_2 then updates the pixel preservation information (h,v+1) to pixel preservation information (h,v) (1701_2'). As a result, modification information (h,v+1)={count value V(h,v+1)=2 and pixel preservation information (h,v+1)}. In addition, pixel preservation information (h,v+1)={preserved density 1($h,v$+1)=(0,50,0,0) and preserved density 2($h,v$)= (0,40,0,0)}.

The image transformation processing unit 102_2 thus preserves the modification information.

Next, the image transformation processing unit 102_2 performs the unprocessed pixel detection process at S201_3 to determine whether there are any unprocessed pixels.

If it is determined at S201_5 that there is an unprocessed pixel, the process flow proceeds to S201_6, whereas the process flow proceeds to S201_7 it is determined at S201_5 that there is no unprocessed pixel.

The image transformation processing unit 102_2 performs the pixel update process at S201_6 to shift the reference area by one pixel along the main-scanning direction, and advances the process flow to S201_0 where the reference area obtaining process is performed.

The image transformation processing unit 102_2 repeats the process to perform the process on all the pixels along the main-scanning direction.

Here, the reference area 1702_3 is the reference area of the last pixel (h+l,v+1) along the main-scanning direction. The modification density 1702_3' is the modification density of the last pixel (h+l,v+1) along the main-scanning direction. The count value V(1702_3") is the count value V of the last pixel (h+l,v+1) along the main-scanning direction. The image transformation processing unit 102_2 modifies the pixel (h+l,v+1) to a pixel' (h+l,v+1) similarly to the pixel (h,v+1), and a pixel 1702_4 is obtained.

As a result, although the density before modification is pixel (h+l,v+1)=(0,50,0,0) for the pixel-of-interest (h+l,v+1), the density after modification becomes pixel' (h+l,v+1)=(0,0,0,0). In addition, modification information (h+l,v+1)={count value V(h+l,v+1)=2(1701_4") and pixel preservation information (h+l,v+1)1702_4'}. Furthermore, pixel preservation information (h+l,v+1)={preserved density 1($h+l,v+1$)=(0,50,0,0) and preserved density 2($h+l,v$)=(0,40,0,0)}.

The pixels' (h,v+1) to (h+l,v+1) that are obtained as a result of the above process are included in the images 603 and 604 of FIG. 6. In addition, the pixel preservation information (h,v+1) to (h+l,v+1) is shown in the images 607 and 608 of FIG. 6.

On the other hand, the result of output after processing the pixels located at (h,v+1) to (h+l,v+1) by the image transformation processing unit 102_2 is shown in the image 1101_2 of FIG. 11, and the preserved densities 1 and 2 of that case are shown in the image 1102_2 of FIG. 11.

Next, the image transformation processing unit 102_2 shifts the reference area by one pixel along the sub-scanning direction, and advances the process flow to S201_0 where the reference area obtaining process is performed.

The image transformation processing unit 102_2 performs the reference area obtaining process at S201_0 to obtain a 2×2 reference area 1703_1 for the pixel-of-interest (h,v+2).

Next, the image transformation processing unit 102_2 performs the modification information determining process at S201_1 to determine whether there is modification information in the reference area.

If it is determined at S201_1 that there is no modification information, the process flow proceeds to S201_3, whereas the process flow proceeds to S201_2 if it is determined that there is modification information.

Here, the image transformation processing unit 102_2 determines at S201_1 that there is modification information because count value V(h,v+1)=2 holds in the reference area (1703_1').

Therefore, the process flow proceeds to the modification-information-referring modification process (S201_2) where the following process is performed.

Although [count value V(h,v+1)=2≧register value=2] holds, it is updated referring to the pixel preservation information of the pixel located two pixels before the pixel-of-interest because there is pixel preservation information (1703_1") preserved by the image transformation processing unit 102_2. In the embodiment 2, if the preserved density is zero or there is no preserved density in addition to the relation of count value register value, updating process is terminated to perform high-fidelity reproduction of the gradation area. Here, the density refers to the density of the magenta plate. As a result, the density before modification of the pixel-of-interest is pixel (h,v+2)=(0,60,0,0), whereas the density after modification of the pixel-of-interest is given by pixel' (h,v+2)=(0,40,0,0) (1703_2).

Next, the image transformation processing unit 102_2 performs the modification information update process at S201_4 to update the count value V(h,v+2). As a result, modification information (h,v+2)={count value V(h,v+2)=0(1703_2') and pixel preservation information (h,v+2) (1703_1')}. In addition, pixel preservation information (h,v+2)={preserved density 1($h,v+2$)=(0,50,0,0) and preserved density 2($h,v+1$)=(0,60,0,0)}.

The image transformation processing unit 102_2 thus preserves the modification information.

Next, the image transformation processing unit 102_2 performs the unprocessed pixel detection process at S201_5 to determine whether there are any unprocessed pixels.

If it is determined at S201_5 that there is an unprocessed pixel, the process flow proceeds to S201_6, whereas the process flow proceeds to S201_7 if it is determined at S201_5 that there is no unprocessed pixel.

The image transformation processing unit 102_2 performs the pixel update process at S201_6 to shift the reference area by one pixel along the main-scanning direction, and advances the process flow to S201_0 where the reference area obtaining process is performed. The image transformation processing unit 102_2 repeats the process to perform the process on all the pixels along the main-scanning direction.

Here, a reference area 1703_3 is the reference area of the last pixel (h+l,v+2) along the main-scanning direction. A modification density 1703_3' is the modification density of the last pixel (h+l,v+2) along the main-scanning direction. In addition, a count value V(1703_3") is the count value V of the last pixel (h+l,v+2) along the main-scanning direction. The image transformation processing unit 102_2 modifies the pixel (h+l,v+2) to a pixel' (h+l,v+2) similarly to the pixel (h,v+2), and a pixel 1703_4 is obtained.

As a result, although the density before modification is pixel (h+l,v+2)=(0,60,0,0) for the pixel-of-interest (h+l,v+2), the density after modification becomes pixel' (h+l,v+2)=(0,40,0,0). In addition, modification information (h+l,v+2)={count value V(h+l,v+2)=2(1703_4") and pixel preservation information (h+l,v+2)1703_4'}. Furthermore, pixel preservation information (h+l,v+2)={preserved density 1 ($h+l,v+2$)=(0,50,0,0) and preserved density 2($h+l,v+1$)=(0,60,0,0)}.

The pixels' (h,v+2) to (h+l,v+2) obtained as a result of the above process are included in the images 609 and 610 of FIG. 6. In addition, pixel preservation information (h,v+2) to (h+l,v+2) is shown in the images 613 and 614 of FIG. 6.

On the other hand, the result of output after processing the pixels located at (h,v+2) to (h+l,v+2) by the image transformation processing unit 102_2 is shown in the image 1101_3 of FIG. 11, and the preserved densities 1 and 2 of that case are shown in the image 1102_3 of FIG. 11.

Subsequently, the image transformation processing unit 102_2 shifts the reference area by one pixel along the sub-scanning direction, and advances the process flow to S201_0 where the reference area obtaining process is performed.

The image transformation processing unit 102_2 performs the reference area obtaining process at S201_0 to obtain a 2×2 reference area 1704_1 for the pixel-of-interest (h,v+3).

Next, the image transformation processing unit 102_2 performs the modification information determining process at S201_1 to determine whether there is modification information in the reference area.

If it is determined at S201_1 that there is no modification information, the process flow proceeds to S201_3, whereas the process flow proceeds to S201_2 if it is determined that there is modification information.

Here, the image transformation processing unit 102_2 determines at S201_1 that there is modification information because count value V(h,v+2)=0 holds in the reference area (1704_1').

Therefore, the process flow proceeds to the modification-information-referring modification process (S201_2) where the following process is performed.

Although [count value V(h,v+2)=0≦register value=2] holds, it is updated referring to the pixel preservation information of the pixel located two pixels before the pixel-of-interest because there is pixel preservation information (1704_1") preserved by the image transformation processing unit 102_2. As a result, although the density before modification of the pixel-of-interest is pixel (h,v+3)=(0,70,0,0), the density after modification of the pixel-of-interest is given by pixel' (h,v+3)=(0,50,0,0) (1704_2).

Next, the image transformation processing unit 102_2 performs the modification information update process at S201_4 to update the count value V(h,v+3). As a result, modification information (h,v+3)={count value V(h,v+3)=0(1704_2'), pixel preservation information (h,v+3) (1704_1')} is obtained. In addition, pixel preservation information (h,v+3)= {preserved density 1($h,v$+3)=(0,70,0,0), preserved density 2($h,v$+2)=(0,60,0,0)} is obtained.

The image transformation processing unit 102_2 thus preserves the modification information.

Next, the image transformation processing unit 102_2 performs the unprocessed pixel detection process at S201_5 to determine whether there are any unprocessed pixels.

If it is determined at S201_5 that there is an unprocessed pixel, the process flow proceeds to S201_6, whereas the process flow proceeds to S201_7 if it is determined at S201_5 that there is no unprocessed pixel.

The image transformation processing unit 102_2 performs the pixel update process at S201_6 to shift the reference area by one pixel along the main-scanning direction, and advances the process flow to S201_0 where the reference area obtaining process is performed. The image transformation processing unit 102_2 repeats the process to perform the process on all the pixels along the main-scanning direction.

Here, a reference area 1704_3 is the reference area of the last pixel (h+l,v+3) along the main-scanning direction. A modification density 1704_3' is the modification density of the last pixel (h+l,v+3) along the main-scanning direction. In addition, a count value V(1704_3") is the count value V of the last pixel (h+l,v+3) along the main-scanning direction. The image transformation processing unit 102_2 modifies the pixel (h+l,v+3) to a pixel' (h+l,v+3) similarly to the pixel (h,v+3), and a pixel 1704_4 is obtained.

As a result, although the density before modification is pixel (h+l,v+3)=(0,70,0,0) for the pixel-of-interest (h+l,v+3), the density after modification becomes pixel' (h+l,v+3)=(0, 50,0,0). In addition, modification information (h+l,v+3)= {count value V(h+l, v+3)=2(1704_4") and pixel preservation information (h+l,v+3)1704_4'}. Furthermore, pixel preservation information (h+l,v+3)={preserved density 1($h+l,v$+3)=(0,70,0,0) and preserved density 2($h+l,v$+3)=(0, 60,0,0)}.

The pixels' (h,v+3) to (h+l,v+3) obtained as a result of the process are included in the images 611 and 612 of FIG. 6. In addition, pixel preservation information (h,v+3) to (h+l,v+3) is shown in the images 615 and 616 of FIG. 6.

On the other hand, the result of output after processing the pixels located at (h,v+3) to (h+l,v+3) by the image transformation processing unit 102_2 is shown in the image 1101_4 of FIG. 11, and the preserved densities 1 and 2 of that case are shown in the image 1102_4 of FIG. 11.

Subsequently, the image transformation processing unit 102_2 shifts the reference area by one pixel along the sub-scanning direction, and advances the process flow to S201_0 where the reference area obtaining process is performed.

The image transformation processing unit 102_2 performs the reference area obtaining process at S201_0 to obtain a 2×2 reference area 1705_1 for the pixel-of-interest (h,v+4).

Next, the image transformation processing unit 102_2 performs the modification information determining process at S201_1 to determine whether there is modification information in the reference area.

If it is determined at S201_1 that there is no modification information, the process flow proceeds to S201_3, whereas the process flow proceeds to S201_2 if it is determined that there is modification information.

Here, the image transformation processing unit 102_2 determines at S201_1 that there is modification information because count value V(h,v+3)=0 holds in the reference area (1705_1').

Therefore, the process flow proceeds to the modification-information-referring modification process (S201_2) where the following process is performed.

Although [count value V(h,v+2)=0≦register value=2] holds, it is updated referring to the pixel preservation information of the pixel located two pixels before the pixel-of-interest because there is pixel preservation information (1705_1") preserved by the image transformation processing unit 102_2. As a result, although the density before modification of the pixel-of-interest is pixel (h,v+4)=(0,70,0,0), the density after modification of the pixel-of-interest is given by pixel' (h,v+4)=(0,60,0,0) (1705_2).

Next, the image transformation processing unit 102_2 performs the modification information update process at S201_4 to update the count value V(h,v+4). As a result, modification information (h,v+4)={count value V(h,v+4)=0(1705_2) and pixel preservation information (h,v+4)(1705_1)}. In addition, pixel preservation information (h,v+4)={preserved density 1($h,v$+4)=(0,70,0,0) and preserved density 2($h,v$+3)=(0, 70,0,0)}.

The image transformation processing unit 102_2 thus preserves the modification information.

Next, the image transformation processing unit 102_2 performs the unprocessed pixel detection process at S201_5 to determine whether there are any unprocessed pixels.

If it is determined at S201_5 that there is an unprocessed pixel, the process flow proceeds to S201_6, whereas the process flow proceeds to S201_7 if it is determined at S201_5 that there is no unprocessed pixel.

The image transformation processing unit 102_2 performs the pixel update process at S201_6 to shift the reference area by one pixel along the main-scanning direction, and advances the process flow to S201_0 where the reference area obtaining process is performed. The image transformation processing unit 102_2 repeats the process to perform the process on all the pixels along the main-scanning direction.

Here, a reference area 1705_3 is the reference area of the last pixel (h+l,v+4) along the main-scanning direction. A modification density 1705_3' is the modification density of the last pixel (h+1,v+4) along the main-scanning direction. In addition, a count value V(1705_3") is the count value V of the last pixel (h+1,v+4) along the main-scanning direction. The image transformation processing unit 102_2 modifies the pixel (h+1,v+4) to a pixel' (h+1,v+4) similarly to the pixel (h,v+4), and a pixel 1705_4 is obtained.

As a result, although the density before modification is pixel (h+1,v+4)=(0,70,0,0) for the pixel-of-interest (h+1,v+4), the density after modification becomes pixel' (h+1,v+4)=(0, 60,0,0). Modification information (h+1,v+4)={count value V(h+1,v+4)=0(1705_4") and pixel preservation information (h+1,v+4)1705_4'}. In addition, pixel preservation information (h+1,v+4)={preserved density 1($h+l,v+4$)=(0,70,0,0) and preserved density 2($h+l,v+4$)=(0,70,0,0)}.

The pixels' (h,v+4) to (h+1,v+4) obtained as a result of the process are included in the images 617 and 618 of FIG. 6. In addition, the pixel preservation information (h,v+4) to (h+1, v+4) is shown in the images 621 and 622 of FIG. 6.

On the other hand, the result of output after processing the pixels located at (h,v+4) to (h+1,v+4) by the image transformation processing unit 102_2 is shown in the image 1101_5 of FIG. 11, and the preserved densities 1 and 2 of that case are shown in the image 1102_5 of FIG. 11.

The pixels' (h,v+5) to (h+1,v+5) are included in the images 619 and 620 FIG. 6. In addition, the pixel preservation information (h,v+5) to (h+1,v+5) is shown in the images 623 and 624 FIG. 6.

In addition, the pixels' (h, v+6) to (h+1,v+6) are included in the image 625 of FIG. 6, and the pixels' (h,j) to (h+1,j) are included in the image 626 of FIG. 6.

The above process thins the upper part of image 600 including gradation by two pixels, and an image 627 is obtained.

Furthermore, the image transformation processing unit 102_2 performs a process similar to that shown in FIGS. 9A, 9B, 10A and 10B to provide a desired trapping.

In the embodiment 2, the amount of memory required for trapping is shown in FIG. 16. As shown in FIG. 16, the embodiment 2 allows trapping with less memory than prior art even for a complex image including gradation.

Although trapping (a process of thickening or thinning only a particular area of an image) has been described as an example in the embodiments 1 and 2, the embodiments 1 and 2 can also be applied to a process of thickening or thinning the entire image.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-002427, filed Jan. 8, 2009, which is hereby incorporated by reference herein in its entirety.

What is claimed is:

1. An image forming apparatus comprising:
   a reference area obtaining unit that generates and preserves, for a pixel-of-interest of an image, a plurality of pixels around the pixel-of-interest as a reference area;
   a modification information preserving unit that preserves modification information of pixels of the image;
   a modification information determining unit that determines whether there is modification information relating to pixels in the reference area which are preserved by the reference area obtaining unit;
   a modification-information-referring modification unit that modifies, if it is determined by the modification information determining unit that there is modification information, the pixel-of-interest referring to the modification information;
   a reference-area-referring modification unit that modifies the pixel-of-interest based on information in the reference area, if it is determined by the modification information determining unit that there is no modification information;
   a modification information updating unit that updates the modification information based on modification by the reference-area-referring modification unit; and
   a shift unit that modifies the write timing of the image.

2. The image forming apparatus according to claim 1, wherein the modification information includes modification density and a count value.

3. The image forming apparatus according to claim 2, wherein the modification-information-referring modification unit compares the count value with a threshold value and, if the count value is smaller than the threshold value, modifies the pixel-of-interest based on information in the reference area.

4. The image forming apparatus according to claim 3, wherein the modification-information-referring modification unit doubles the threshold value if there exists in the modification information a color plate that does not exist in the pixel-of-interest.

5. The image forming apparatus according to claim 3, wherein the shift unit modifies the write timing by the threshold value.

6. The image forming apparatus according to claim 1, wherein the modification information includes a plurality of preserved densities.

7. An image forming method comprising:
   a reference area obtaining step that generates and preserves, for a pixel-of-interest of an image, a plurality of pixels around the pixel-of-interest as a reference area;
   a modification information preserving step that preserves modification information of pixels of the image;
   a modification information determining step that determines whether there is modification information relating to pixels in the reference area which are preserved by the reference area obtaining step;

a modification-information-referring modification step that modifies, if the modification information determining step determines that there is modification information, the pixel-of-interest referring to the modification information;
a reference-area-referring modification step that modifies the pixel-of-interest based on information in the reference area if the modification information determining step determines that there is no modification information;
a modification information updating step that updates the modification information based on modification by the reference-area-referring modification step; and
a shift step that modifies the write timing of the image.

* * * * *